INPUT-OUTPUT TYPEWRITER HAVING DOUBLE SHIFT MEANS

Filed May 24, 1965 10 Sheets-Sheet 1

INVENTORS
JUN OSHIBA
MITSURO ISOBE
JUNICHI UMEDA
KUNIO KANEKO
BY
Hopgood & Calimafde
ATTORNEYS

INPUT-OUTPUT TYPEWRITER HAVING DOUBLE SHIFT MEANS

Filed May 24, 1965 10 Sheets-Sheet 2

INVENTORS
JUN OSHIBA
MITSURO ISOBE
JUNICHI UMEDA
KUNIO KANEKO

BY Hopgood & Calimafde
ATTORNEYS

Sept. 20, 1966 JUN OSHIBA ET AL 3,273,684

INPUT-OUTPUT TYPEWRITER HAVING DOUBLE SHIFT MEANS

Filed May 24, 1965 10 Sheets-Sheet 3

INVENTORS
JUN OSHIBA
MITSURO ISOBE
JUNICHI UMEDA
KUNIO KANEKO

BY Hopgood & Calimafde
ATTORNEYS

Sept. 20, 1966 JUN OSHIBA ETAL 3,273,684

INPUT-OUTPUT TYPEWRITER HAVING DOUBLE SHIFT MEANS

Filed May 24, 1965 10 Sheets-Sheet 4

INVENTORS
JUN OSHIBA
MITSURO ISOBE
JUNICHI UMEDA
KUNIO KANEKO

BY Hopgood & Calimafde
ATTORNEYS

INPUT-OUTPUT TYPEWRITER HAVING DOUBLE SHIFT MEANS

Filed May 24, 1965 10 Sheets-Sheet 5

INVENTORS
JUN OSHIBA
MITSURO ISOBE
JUNICHI UMEDA
KUNIO KANEKO
BY
Hopgood & Calimafde
ATTORNEYS

INPUT-OUTPUT TYPEWRITER HAVING DOUBLE SHIFT MEANS

Filed May 24, 1965 10 Sheets-Sheet 6

INVENTORS
JUN OSHIBA
MITSURO ISOBE
JUNICHI UMEDA
KUNIO KANEKO
BY
Hopgood & Calimafde
ATTORNEYS INVENTORS
JUN OSHIBA
MITSURO ISOBE
JUNICHI UMEDA
KUNIO KANEKO
BY
Hopgood & Calimafde
ATTORNEYS INVENTORS
JUN OSHIBA
MITSURO ISOBE
JUNICHI UMEDA
KUNIO KANEKO
BY
Hopgood & Calimafde
ATTORNEYS Sept. 20, 1966 JUN OSHIBA ET AL 3,273,684

INPUT-OUTPUT TYPEWRITER HAVING DOUBLE SHIFT MEANS

Filed May 24, 1965 10 Sheets-Sheet 9

INVENTORS
JUN OSHIBA
MITSURO ISOBE
BY JUNICHI UMEDA
KUNIO KANEKO

Hopgood & Calimafde
ATTORNEYS

INPUT-OUTPUT TYPEWRITER HAVING DOUBLE SHIFT MEANS

INVENTORS
JUN OSHIBA
MITSURO ISOBE
JUNICHI UMEDA
KUNIO KANEKO
BY
Hopgood & Calimafde
ATTORNEYS 3,273,684

INPUT-OUTPUT TYPEWRITER HAVING DOUBLE SHIFT MEANS

Jun Oshiba, Mitsuro Isobe, Junichi Umeda, and Kunio Kaneko, all of Tokyo, Japan, assignors to Nippon Electric Company, Limited, Minato-ku, Japan, a corporation of Japan Filed May 24, 1965, Ser. No. 457,975
Claims priority, application Japan, May 25, 1964, 39/29,261
8 Claims. (Cl. 197—19)

This invention relates to an input-output typewriter which may be used in an electronic computer, in a perforating typewriter system, or the like.

An input-output typewriter is generally used to send out a succession of code combinations, each composed of several unit binary elementary codes complying with a letter (which may be a symbol, a numeral, or a punctuation mark) selected by depressing a key, or representing a space to be put between two contiguous words by depressing the space bar.

While popularization and progress of a data-handling apparatus has augmented the number of letters to be dealt with, it has been nearly impossible to arrange as many key tops in the keyboard of an input-output typewriter as are required, because the keyboard must be manipulated with ease. It therefore becomes necessary to allot three letters to a key top with a view to augmenting the letters accommodated by the keyboard of the restricted number of keys, and to use three types of shift keys each of which selects, once depressed, one of the three letters allotted to a key top subsequently depressed. Furthermore, it is desirable to allot the letters to the keyboard in accordance with the keyboard of a conventional four row touch system clerical typewriter having a close connection with data handling.

In order to deal by an electronic computer with numerous code combinations, it is desirable that the code combinations be assigned to the letters with correspondence kept in each group of letter (for example, each of the groups of Latin letters, Russian letters, Greek letters, Japanese kana letters, and/or numerals) between the numbers represented by the code combinations and the order of the letters (for example, the alphabetical order and the order of numbers). It has been supposed preferable to allot these code combinations to the letters in one sequence so that the code combinations may form a single code family. However, it is rather desirable in the instant case, to use two code families, or two manners of allotment, which may be called a main and an auxiliary code family, and to allot one of these two families (for example, the main family) and the other thereof to the group of Latin letters and the other group or groups of letters, respectively. In this way the Latin letters may be assigned with the international standard code combinations for the data-handling systems, and other letters may be assigned with code combinations optional for such letters. In this connection, it becomes necessary to use specific code combinations for designating whether the code combinations following one of the specific code combinations are those allotted to the letters according to the main code family or those allotted according to the auxiliary code family.

In an input-output typewriter of the required design, it happens, rather desirably, that while the upper-case and the lower-case letters are assigned with code combinations according to the main and the auxiliary code families, respectively, or vice versa, some of the middle-case letters are allotted to code combinations according to the main code family, and the remainder thereof according to the auxiliary code family.

Accordingly, it is an object of this invention to provide a three-stage-shift two-code-family input-output typewriter whereby a considerable large number of letters of at least two types of alphabets, numerals, punctuation marks, and symbols may be handled with a keyboard arrangement having the best possible efficiency of manipulation and code combinations of the best possible adaptability to data-handling, teleprinting, or the like service.

Another object of the invention is to provide an input-output typewriter of the type wherein a touch given to a letter key can produce, according to whether the typewriter mechanism is shifted to a first-letter, a second-letter, or a third-letter position, a code combination specific to the letter designated by a touch given preliminarily to the shift key means and by a touch given to the letter key, with a specific code combination for indicating shift between the two manners of assigning the code combinations to the respective letters being automatically sent out, if necessary, before the code combination allotted to the selected letter.

All of the objects, features and advantages of this invention and the manner of attaining them will become more apparent and the invention itself will be best understood by reference to the following description of an embodiment of the invention taken in conjunction with the accompanying drawing, in which.

Figure 11:
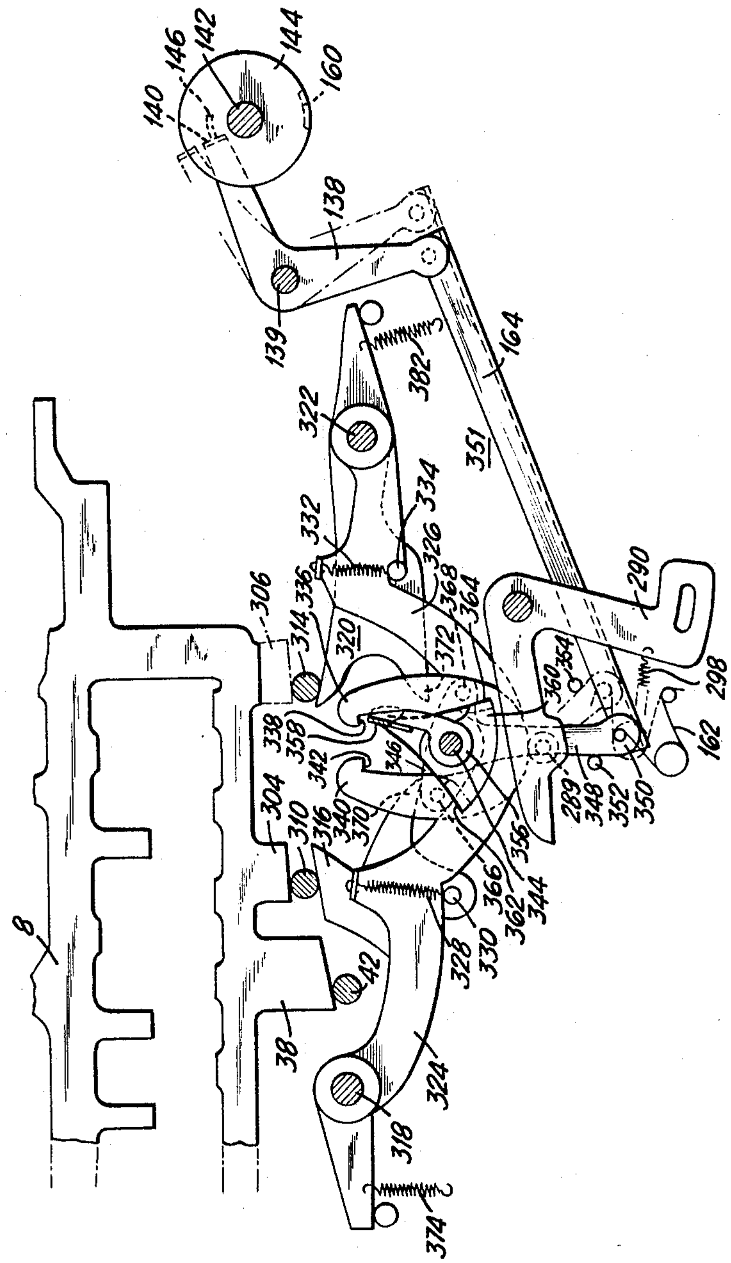
FIG. 11 shows, with a partial sectional side view, a middle-case code plate for a main-family letter and an automatic code-family shift and trigger-suppression releasing portion of the embodiment in the state shifted for the auxiliary-family operation.
Figures 16, 17:
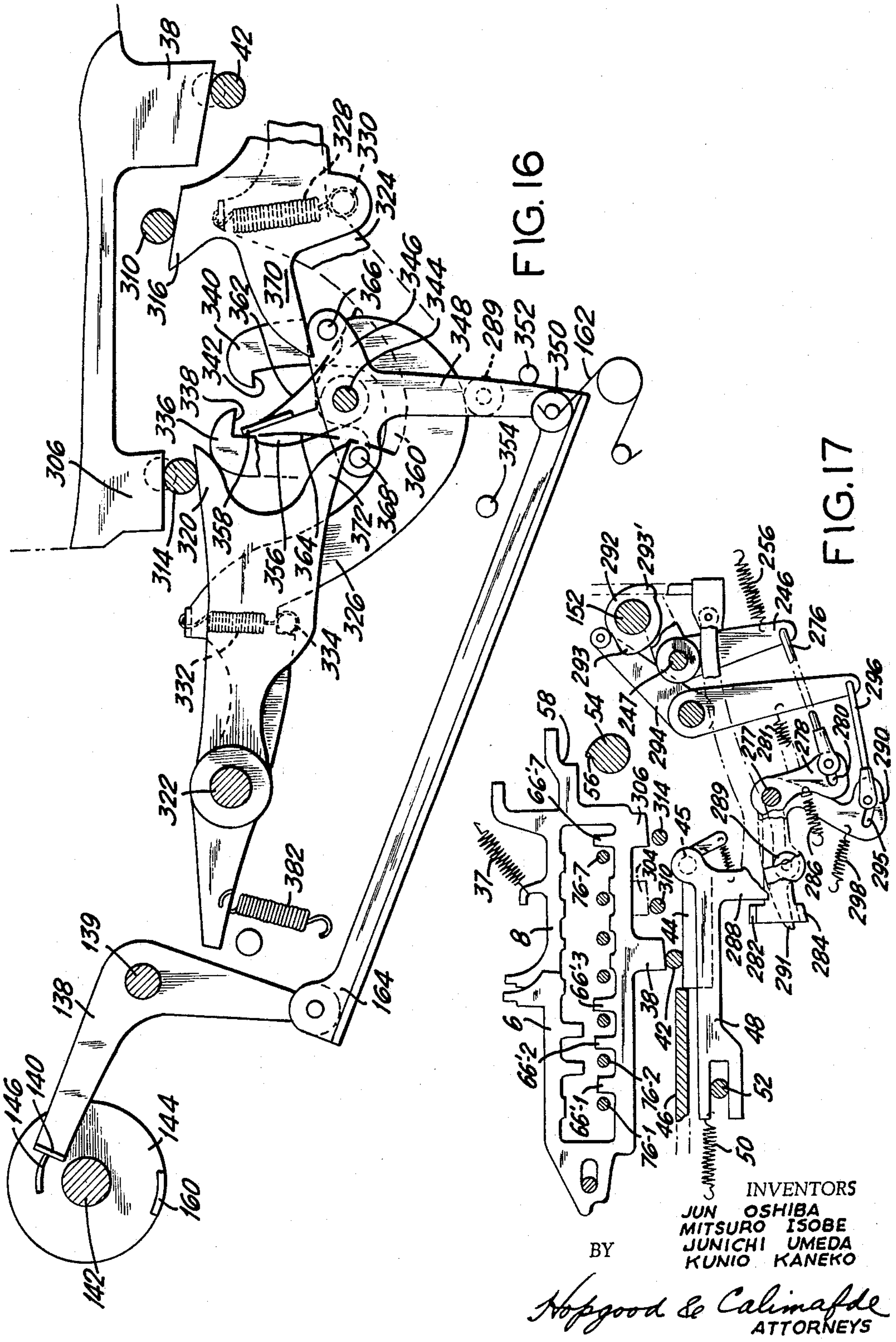

FIG. 16 shows, with a similar view seen from the back of FIG. 11, the automatic code-family shift and trigger-suppression releasing portion in a state where a middle-case code plate for an auxiliary-family letter is pressed down while the typewriter mechanism has been shifted for the auxiliary-family operation; and FIG. 17 is a partial sectional side view showing a code-plate-clutch triggering portion, a trigger suppressing portion, and a trigger-suppression releasing portion of the embodiment in the state shifted for the middle-case letters.

According to an aspect of this invention, there is provided an input-output typewriter having a plurality of letter keys, each being assigned with first-letter-position, second-letter-position, and third-letter-position letters, and with first-letter-position, second-letter-position, and third-letter-position shift-key means for selecting the desired ones of the first-letter-position, the second-letter-position, and the third-letter-position letters, respectively, the first-letter-position letters being assigned with letter code combinations, respectively, according to a first manner of assignment, the second-letter-position letter being assigned with letter code combinations, respectively, according to a second manner of assignment, some of the third-letter-position letters being assigned with letter code combinations, respectively, according to said first manner of assignment, and the others of said third-letter-position letters being assigned with letter code combinations, respectively, according to said second manner of assignment. Each of said letter keys is accompanied by a first-letter-position encoding-member group complying with the letter code combination allotted to the first-letter-position letter, and a second-letter-position encoding-member group complying with the letter code combination allotted to the second-letter-position letter.

Each of the letter keys whose third-letter-position letters are assigned with letter code combinations according to said first manner of assignment is accompanied by a first-code-family third-letter-position encoding-member group complying with the letter code combination allotted to the third-letter-position letter and a first code-family-shift operating member.

Each of the letter keys whose third-letter-position letters are assigned with letter code combinations according to said second manner of assignment is accompanied by a second-code-family third-letter-position encoding-member group complying with the letter code combination allotted to the third-letter-position letter and a second code-family-shift operating member.

Said typewriter also includes at least one code contact capable of producing a signal representing one of the letter code combinations, a first-code-family shift code combination indicating that at least one following letter code combination is that allotted to a letter according to said first manner of assignment, and second-code-family shift code combination indicating that at least one following letter code combination is that allotted to a letter according to said second manner of assignment.

Said typewriter further includes a code-family-shift indicator-activator capable of being put into a first-code-family and a second-code-family position, a letter code-contact activator, a first-code-family code-contact activator, a second-code-family code-contact activator, an encoder trigger, and an encoder-trigger controller.

When put into said first-code-family position, said code-family-shift indicator-activator causes said letter code-contact activator to be coupled with neither the second-letter-position nor the second-code-family third-letter-position encoding-member groups, but rather with all the first-letter-position and the first-code-family third-letter-position encoding-member groups and, at the same time, causes said first-code-family code-contact activator to make said code contact produce said first-code-family shift code combination.

When put into said second-code-family position, said code-family-shift indicator-activator causes said letter code-contact activator to be coupled with neither said first-letter-position nor said first-code-family third-letter-position encoding-member groups, but rather with all said second-letter-position and said second-code-family third-letter-position encoding-member groups and, at the same time, causes said second-code-family code-contact activator to make said code contact produce said second-code-family shift code combination.

When touched, said first-letter-position shift-key means brings the typewriter mechanism into a first-letter-position where all the first-letter-position encoding-member groups are brought into cooperative relation with the respective letter keys accompanied thereby and all the third-letter-position encoding-member groups are brought into non-cooperative relation with said letter keys, and cooperates with said code-family-shift indicator-activator to allow, in case the same is in said first-code-family position, the same to stand and put, in case the same is in said second-code-family position, the same into said first-code-family position.

When touched, said second-letter-position shift-key means brings said typewriter mechanism into a second-letter position where all the second-letter-position encoding-member groups are brought into cooperative relation with the respective letter keys accompanied thereby, and all said third-letter-position encoding-member groups are brought into non-cooperative relation with said letter keys, and cooperates with said code-family-shift indicator-activator to allow, in case the same is in said second-code-family position, the same to stand and put, in case the same is in said first-code-family position, the same into said second-code-family position.

When touched, said third-letter-position shift-key means brings said typewriter mechanism into a third-letter position where all said first-letter-position and said second-letter-position encoding-member groups are brought into non-cooperative relation with said letter keys and all said third-letter-position encoding-member groups are brought into cooperative relation with the respective letter keys accompanied thereby; additionally, said letter keys are brought into cooperative relation with the respective ones of said first and said second-code-family-shift operating members accompanied thereby, said code-family-shift operating members are brought into cooperative relation with said encoder-trigger controller and with said code-family-shift indicator-activator, and said encoder-trigger controller is brought into a position to suppress said encoder trigger.

In case said typewriter mechanism is in one of said first-letter and said second-letter positions, a touch given to one of said letter keys puts said encoder-trigger into operation to make the corresponding one of the accompanying first-letter-position and second-letter-position encoding-member groups activate said code contact through said letter code-contact activator, thereby producing the desired letter code combination.

When the typewriter mechanism is in said third-letter position and when said code-family-shift indicator-activator is in said first-code-family position, a touch given to one of the letter keys accompanied by said first-code-family third-letter-position encoding-member groups, causes the accompanying first code-family-shift operating member to cooperate with said code-family-shift indicator-activator and causes said encoder-trigger controller to temporarily release suppression of said encoder-trigger, thereby producing the desired letter code combination, and a touch given to one of the letter keys accompanied by said second-code-family third-letter-position encoding-member groups, causes the accompanying second code-family-shift operating member to cooperate with said code-family-shift indicator-activator to put the same into said second-code-family position, thereby producing said second-code-family shift code combination, and thereafter causes said encoder-trigger controller to temporarily release suppression of said encoder-trigger to put the same into operation, thereby producing the desired letter code combination.

When the typewriter mechanism is in said third-letter position and when said code-family-shift indicator-activator is in said second-code-family position, a touch given to one of the letter keys accompanied by the second-code-family third-letter-position encoding-member groups, causes the accompanying second code-family-shift operating member to cooperate with said code-family-shift indicator-activator and causes said encoder-trigger controller to temporarily release suppression of said encoder-trigger, thereby producing the desired letter code combination, and a touch given to one of the letter keys accompanied by the first-code-family third-letter-position encoding-member groups, causes the accompanying first code-family-shift operating member to cooperate with said code-family-shift indicator-activator to put the same into said first-code-family position, thereby producing said first-code-family shift code combination, and thereafter causes said encoder-trigger controller to temporarily release suppression of said encoder-trigger to put the same into operation, thereby producing the desired letter code combination.

In the following description, the first-letter, the second-letter, and the third-letter positions are called the upper, the lower, and the middle positions, respectively. Also, the encoding-member group assumes the form of a code-protrusion group, the code-family-shift operating member assumes the form of a code-family-shift protrusion, the code-family-shift indicator-activator assumes the form of a four-bar linkage, the letter code-contact activator assumes a form intermediary of the first-code-family and the second-code-family code-contact activators, the encoder-trigger assumes the form of a trigger link, and the encoder-trigger controller takes the form of a combination of a trigger suppressing bell crank, a trigger releasing bell crank, trigger releasing levers, and a release cam.

According to another aspect of the invention, the letter keys are substantially equal in number to those accommodated in the keyboard of a conventional touch-system clerical typewriter, and contain the letters of at least two alphabets, some numerals, some puncutation marks, and some symbols. The upper-case letters are those of at least one letter group, such as a group of the Latin letters and a group of the Arabic numerals, and are arranged substantially in the same manner as in the keyboard of a conventional typewriter. The lower-case letters are at least a majority of the letters of a second letter group, such as the Russian alphabet, the Greek alphabet, or the Japanese kana alphabet. Some of the middle-case letters are the remainder of the second-letter-group letters and others thereof are "letters" for frequent use together with the upper-case letters. Letters of the second group are also arranged substantially as in a conventional typewriter. The code combinations are allotted to the letters of the first letter group in one of the conventional manners of assigning code combinations to such letters. Also, they are allotted to letters of the second letter group in one of the conventional manners. Therefore, at least some of the code combinations are dually allotted to the first-letter-group and to the second-letter-group letters.

(1) KEYBOARD AND CODE COMBINATIONS

Figure 1:
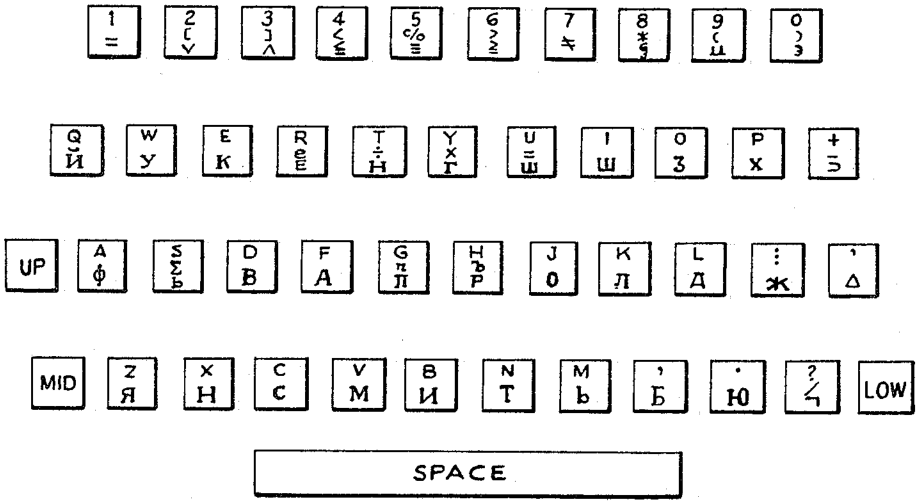
FIG. 1 shows one example of a keyboard arrangement for an input-output typewriter of the invention.

Referring now to FIG. 1, it will be seen that the Latin letters, together with the Arabic numerals, punctuation marks and some symbols, and the Russian letters, together with some other symbols, are arranged on the keyboard of an embodiment of this invention in substantially the same manner as on the keyboards of a Latin-letter and a Russian-letter clerical typewriter, respectively. This keyboard is provided with, in addition to a single upper-case shift key (or a pair of shift keys of substantially the same function) and a space bar, a middle-case shift key as in the three-stage-shift portable typewriter, and also a lower-case shift key which is not used in the clerical typewriter. It should be noted in connection with this particular embodiment that Latin letters and the Arabic numerals are allotted to the keys as their upper-case letters and that blank positions are left on a considerable number of keys at their middle-case positions. The reason therefor is that this embodiment was primarily designed for use in Japan and consequently that a majority of the Japanese letters of the Katakana alphabet of higher occurrence were arranged in the lower case while more than twenty thereof of lower occurrence were arranged in the middle cases. Consequently, it is possible to arrange, if desired, the Latin letters in the lower cases or to assign some symbols of particular uses to the keyboard at the blank middle-case positions.

Figure 2:
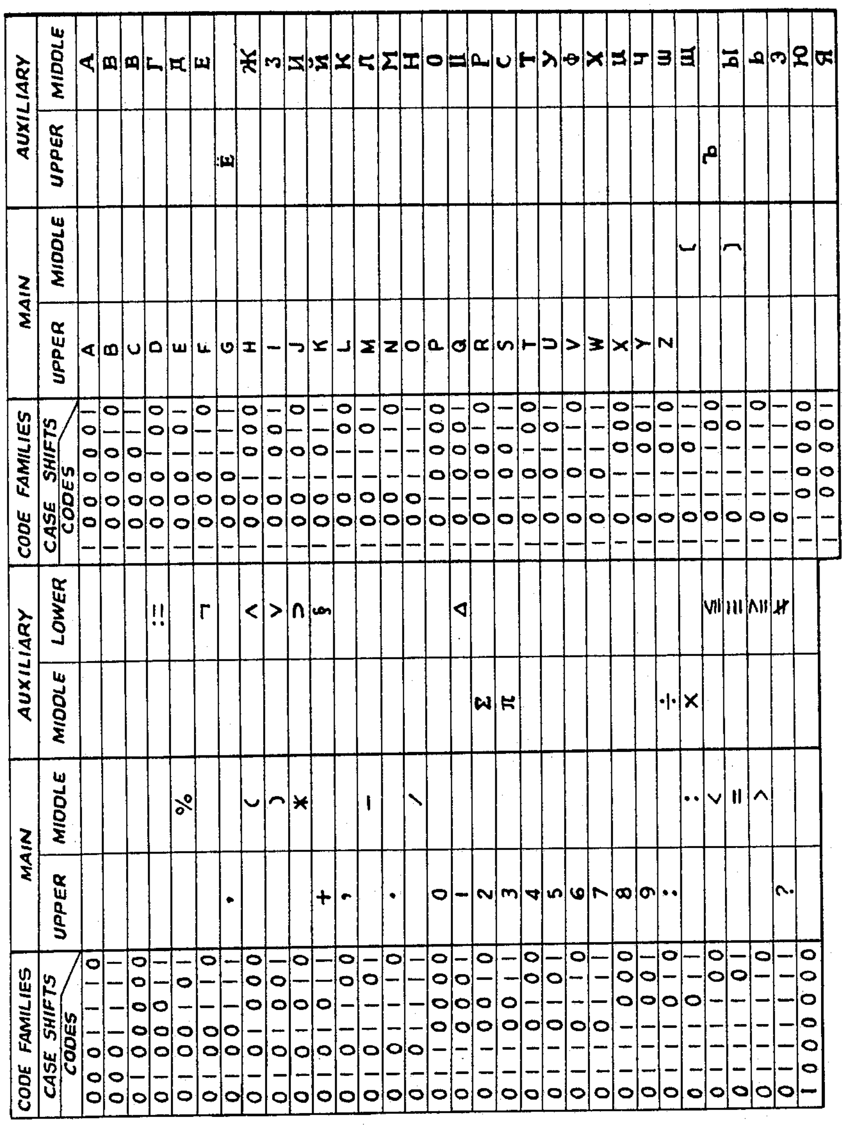
FIG. 2 shows one example of a chart for assigning, according to the invention, code combinations to the letters, numerals, punctuation marks, and symbols illustrated in FIG. 1.

Referring now to FIG. 2, some of the code combinations 0000000, 0000001, 0000010 0000011 . . . 1111110, and 1111111 of seven-digit binary codes are assigned to the letters (numerals, punctuation marks, and symbols inclusive) accommodated in the keyboard of FIG. 1 in the order of the Latin letters (from 1000001 to 1011010 for A to Z), the Russian letters (from 10000001 to 1100001 for A to Я), and the Arabic numerals (from 0110000 to 0111001 for 0 to 9), so that the embodiment may be used with excellent efficiency in data-handling with an electronic computer. According to this invention, most of these code combinations used in this embodiment are dually used as those of the main code family and those of the auxiliary code family. With the example of the code chart being illustrated, code-family shift from a succession of auxiliary-family code combinations to another succession of main-family code combinations is represented by a specific code combination 0001110 interposed between these two successions, and that from main-family code combinations to auxiliary-family code combinations is represented by another specific code combination 0001111. These two code combinations belong to none of the code families and are sent out by the input-output typewriter of this invention automatically in a manner to be described later. Each space between two successive words is represented by still another specific code combination 0100000, which also belongs to none of the code families. This latter specific code combination is sent out by a touch of the space bar.

Most of the other code combinations illustrated in FIG. 2 are used as the main-family-code combination, if not directly preceded by an auxiliary-family shift code combination, and as the auxiliary-family one, if not directly succeeding a main-family shift code combination. Thus, a code combination 1001111 represents, if used as a main-family code combination, a Latin letter "O" and, if employed as an auxiliary-family code combination, a Russian letter "H." It should be noted that other correspondence between the code combinations and the letters is possible and that other code combinations may be used as the three specific code combinations so long as they are assigned to none of the letters. It should be understood, however, that all the upper-case and lower-case letters are assigned with the main-family and the auxiliary-family (or the auxiliary-family and the main-family) code combinations, respectively, and that some of the middle-case letters are allotted to the main-family combination, the remaining ones of the middle-case letters being allotted to the auxiliary-family code combination.

Description will now be made of an input-output typewriter having a keyboard as shown in FIG. 1 and adapted to send out the code combinations illustrated in FIG. 2. This input-output typewriter sends out, by a stroke of a letter key (which may be a key for a letter, numeral, a punctuation mark, or a symbol) one of the code combinations that is particular to the letter shown thereon and designated by a depression given in advance to one of the shift keys. More particularly, after the upper-case shift key is once depressed, successive touches to the letter keys send out the code combinations for the respective upper-case letters. After the lower-case shift key is once pressed down, subsequent touches of the letter keys send out the respective lower-case-letter code combinations. When the middle-case shift key is once depressed, mere successive touches to the letter keys send out the code combinations for the middle-case letters, with shift code combinations for the code families being automatically sent out when required. For instance, if it is desired to type "$U$III$=$III," mere successive touches of the upper-case shift key, the $U=$key, the lower-case shift key, the $U=$III key, the middle-case shift key, the $U=$III key, the lower-case shift key, and the $U=$III key, are sufficient to send out the required code combinations of the main-family shift, U, the auxiliary-family shift, III, the main-family shift, =, the auxiliary-family shift, and III.

(2) ENCODING PORTION

(A) *From a key top to an upper and lower case code plate*

Figure 3:
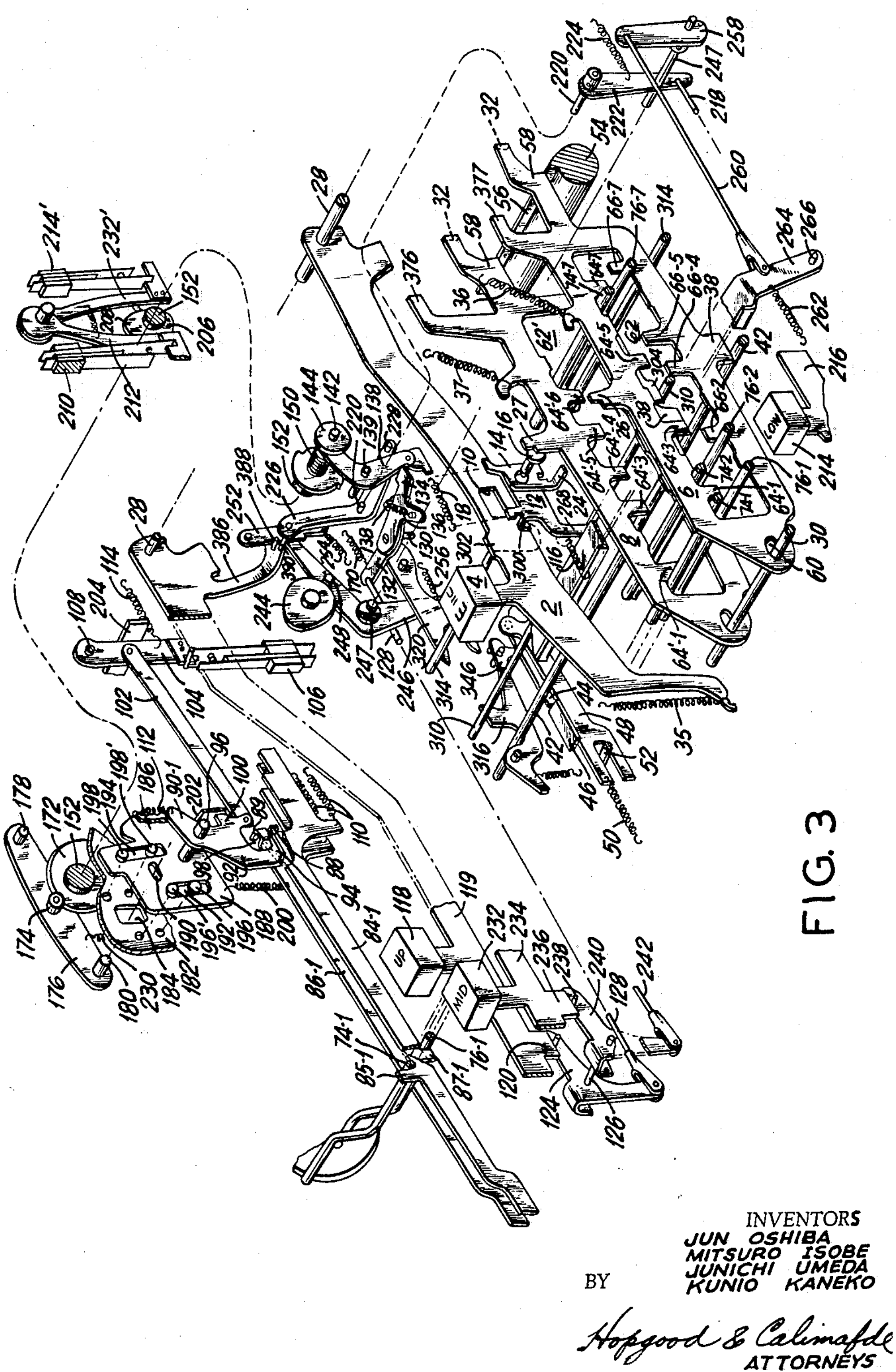
FIG. 3 is an exploded fragmentary perspective view of the principal portion of one embodiment of the invention, illustrated in a state wherein the typewriter mechanism is shifted for the lower-case letters.
Figure 4:
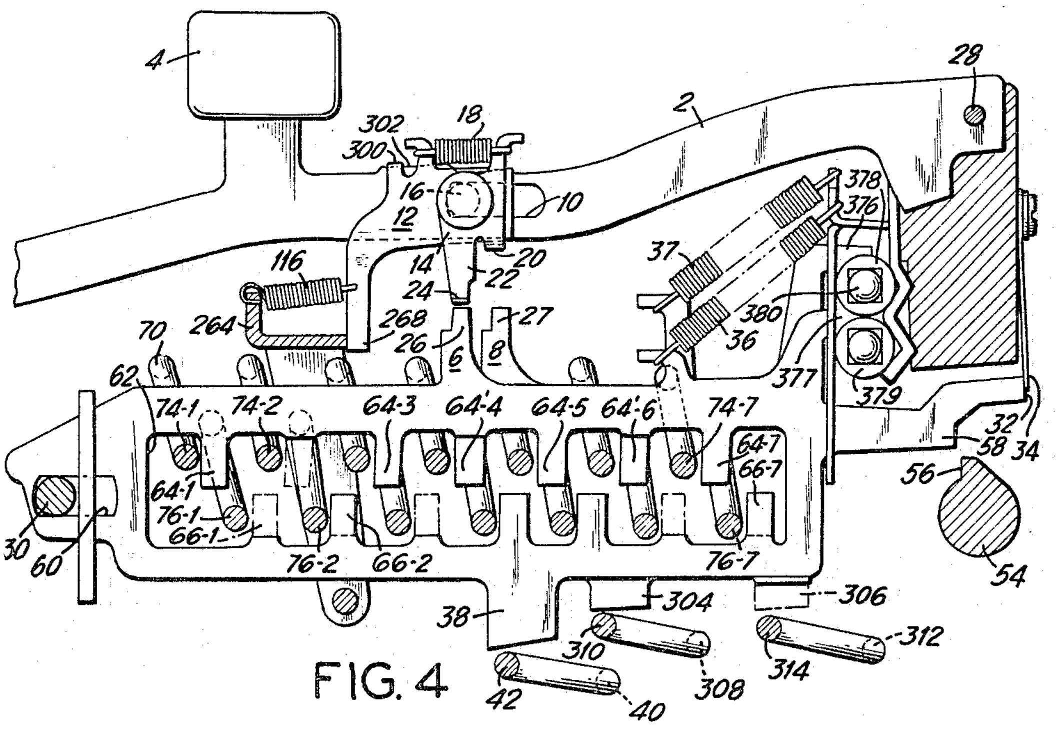
FIG. 4 is an enlarged partially sectional side view of an encoding portion of said embodiment, shown in the state shifted for the upper-case for the lower-case letters.

Referring now to FIGS. 3 and 4, each key lever 2 has a key top 4, on which three letters are generally displayed. Under each key lever 2, there are, in side by side relation, an upper and lower-case code plate 6, for the upper-case and the lower-case letters of the key top 4, rockable at a code-plate slot 60 formed in its front end around a common fixed code-plate axle 30, and a middle-case code plate 8, for the middle-case letter of the key top 4, rockable similarly around the code-plate axle 30. At nearly center portion of each key lever 2, there is a key lever slot 10, which slidably holds a pin 16 carrying a switching plate 12 and a code-plate rocker 14. Each code plate rocker 14 itself is rockable around the pin 16 and is urged counterclockwise by a code-plate rocker spring 18 connecting the same with the switching plate 12. This counterclockwise rocking of each code-plate rocker 14 is limited by a tab 20 thereof embracing the lower edge of the associated switching plate 12.

Each code-plate rocker 14 seen in both FIGS. 3 and 4, has a downward extension 22, having in turn a bent end 24, which rests, in the state where the typewriter mechanism is shifted for the upper-case or the lower-case letters, above an upward projection 26 of the upper and lower-case code plate 6 with a small gap left therebetween. When a stroke is applied to the key top 4, the accompanying key lever 2 is rocked counterclockwise around a common key lever axle 28 and in turn rocks, through the bent end 24 of the accompanying code-plate rocker 14, the associated upper and lower-case code plate 6 clockwise around the code-plate axle 30. A code-plate leaf spring 34 attached to the machine frame is urged, by its own spring action, against a rear end projection 32 of each code plate. When an upper and lower-case code plate 6 is rocked and the rear upper corner of its rear end projection 32 is depressed below the lower end of the associated code-plate leaf spring 34, this spring 34 springs to the left above the upper edge of the end projection 32. It follows therefore that even when the key lever 2 returns to its normal position by the action of a key lever spring 35 associated therewith, the rocked upper and lower-case code plate 6 is held by the code-plate leaf spring 34 in its clockwise rocked position against the action of an upper and lower-case code-plate spring 36 provided for causing the return movement of the plate 6.

(B) *Driving of a rocked upper and lower-case code plate*

Each upper and lower-case code plate 6, see FIGS. 3 and 4, has nearly at the center portion of its lower outer edge a downwardly extending clutch-trigger projection 38 which abuts upon a common clutch-trigger bail 42 rockable at a pair of pivots 40 therefor. The clutch-trigger bail 42 lies, as seen in FIG. 17, adjacent to a clutch-trigger lever 44. When an upper and lower-case code plate 6 is rocked clockwise, the clutch-trigger bail 42 rocks the clutch-trigger lever 44 counterclockwise about a pivot 45 to release the same from a trigger retaining plate 46, with the result that a trigger link 48 is pulled by a trigger-link spring 50, being guided by a trigger-link stud 52. This forward movement of the trigger link 48 releases a suitable code-plate clutch meet assign mechanism (not shown) to allow counterclockwise rotation of a code-plate driving shaft 54 having a driving ridge 56. Each upper and lower-case code plate 6 has at its rear end portion a drive receiving shoulder 58 in engageable relation to the driving edge 56. When an upper and lower-case code plate 6 is rocked clockwise, its drive receiving shoulder 58 stands in the way of the driving ridge 56. Thus, immediately after a touch is given to a key top 4 in the state shifted for the upper-case or the lower-case letter, the code-plate driving shaft 54 is rotated, and in turn moves frontward the upper and lower-case code plate 6 associated with the key top 4 against the action of the accompanying upper and lower-case code-plate spring 36 within the range afforded by its code-plate slot 60.

(C) *Movement of the upper and lower-case code-plate to close the code contacts*

Each of the upper and lower-case code plates 6, still referring to FIGS. 3 and 4, has two groups of code-protrusions, one for the upper-case letter and the other for the lower-case letter, the number of which in each group is equal to the number of units in a code combination. More particularly, each upper and lower-case code plate 6 has an opening 62, into which there extends downwardly a main-family code-protrusion group 64 for the code combination of the upper-case letter, and also into which there projects upwardly an auxiliary-family code-protrusion group 66 for the code combination of the lower-case letter. In case the key top 4 is for U at the upper case and for III at the lower case, the code-protrusion groups 64 and 66 have, respectively, main-family code protrusions 64–1, 64–3, 64–5, and 64–7 corresponding, in reverse order, to the code combination 1010101, and auxiliary-family code protrusions 66–2, 66–4, 66–5, and 66–7 corresponding, in reverse sequence, to the code combination 1011010, as shown.

The main-family code-protrusion groups, such as 64 in FIGS. 3 and 4, are accompanied by a common main-family code-bail group 74, while the auxiliary-family code-protrusion groups, such as 66, are accompanied by a common auxiliary-family code-bail group 76. As an upper and lower-case code plate 6 is moved frontward by the code-plate driving shaft 54, all the main-family and the auxiliary-family code protrusions rock the adjacent code bails around respective pairs of pivots 70. For example, the main-family and the auxiliary-family code protrusions 64–1, 64–3, 64–5, 64–7, 66–2, 66–4, 66–5, and 66–7 rock the main-family code bails 74–1, 74–3, 74–5, 74–7, and the auxiliary-family code bails 76–2, 76–4, 76–5, and 76–7, respectively.

Figures 6, 7, 8:
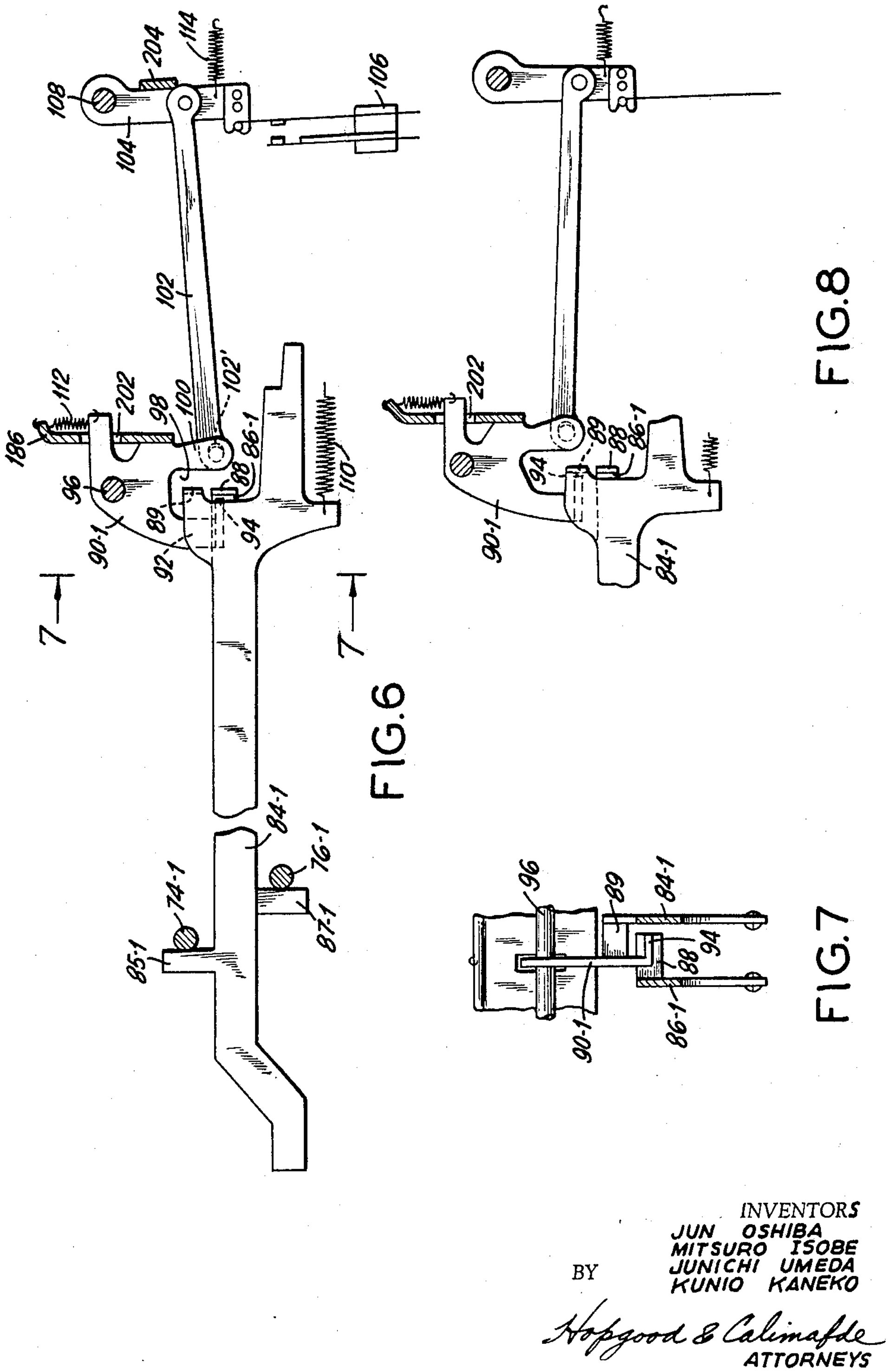
FIG. 6 shows, with a similar view, the relation between a pair of activating plates and an intermediary lever in a state where the typewriter mechanism is shifted for the auxiliary-family operation.
FIG. 7 is a transverse sectional view taken on line 7—7 of FIG. 6.
FIG. 8 shows, with a partial sectional side view, the relation between a pair of activating plates and an intermediary lever in a state shifted for the main-family operation.

The main-family and the auxiliary-family code-bail groups 74 and 76 of FIG. 3 are accompanied, respectively, by a main-family activating-plate group 84 and an auxiliary-family activating-plate group 86, which are horizontally movable. A main-family and an auxiliary-family activating plate, such as 84–1 and 86–1, for a pair of corresponding code-protrusions of the upper and lower-case code-plates, such as 6, are arranged in a pair, as seen in FIGS. 3, 6, and 7. The number of such activating-plate pairs is equal to the number of units in a code combination. Each main-family activating plate, such as 84–1, has an upwardly projecting protrusion, such as 85–1, extending adjacent to the corresponding bail of the main-family code-bail group 74. Also, each auxiliary-family activating plate, such as 86–1, has a downwardly projecting protrusion, such as 87–1, extending adjacent to the corresponding bail of the auxiliary-family code-bail group 76. When main-family and auxiliary-family code bails, such as 74–1 and 76–2, are rocked by the main-family and the auxiliary-family code protrusions, such as 64–1 and 66–2 respectively, they move the corresponding ones of the main-family and the auxiliary-family activating plates frontward. Thus, immediately, after a touch is given to the illustrated key top 4 in the state shifted for the upper-case or the lower-case letters, the code-plate driving shaft 54 moves, through the upper and lower-case code plate 6 and some of the main-family and the auxiliary-family code bails, the main-family and the auxiliary-family activating plates 84–1, 84–3, 84–5, 84–7, 86–2, 86–4, 86–5, and 86–7.

Each pair of the main-family and the auxiliary-family activating plates, such as 84–1 and 86–1, seen in FIGS. 3, 6, 7 and 8, are accompanied by an intermediary lever 90–1 or the like, such levers being provided in a number equal in total to the number of units in a code combination. A front arm member 92, having a bent tab 94, and also including an intermediary lever, such as 90–1, is placed between each activating pair, such as 84–1 and 86–1. In the state shifted for the lower-case letters and consequently for the auxiliary-family operation, a front side surface of each bent tab 94 faces, leaving a small gap, a bent tab 88 on each auxiliary-family activating plate, such as 86–1, but does not face (see FIGS. 6 and 7) a similar bent tab 89 of each main-family activating plate, such as 84–1. The intermediary levers, such as 90–1, are rockably carried by a common intermediary-lever axle 96 which is fixed at both ends to a pair of vertically movable side plates, such as 188, of an intermediary-lever holder 186 to be described later. Each intermediary lever, such as 90–1, has a notch 98 serving as the relief for the bent tabs 88 and 89 of the associated activating-plate pair.

A rear arm 100 of each intermediary lever, such as 90–1, is pivoted as seen in FIGS. 3, 6, and 8 to a link 102, which in turn is pivoted to a code-contact lever 104. The code-contact levers, such as 104, are rockable around a common code-contact-lever axle 108 and act, when rocked, on code contacts 106. Thus, immediately after a stroke is given to a key top 4 in the state shifted for the auxiliary-family operation, a sequence of operation takes place which includes: the code-plate driving shaft 54 causing forward movement of the corresponding upper and lower-case code plate 6, clockwise rocking of the main-family and the auxiliary-family code bails according to all the code protrusions of the moved upper and lower-case code plate 6, forward movement of the associated main-family and auxiliary-family activating plates, clockwise rocking of those intermediary levers which comply only with the moved auxiliary-family activating plate but not with any one of the remaining actvating plates including the moved main-family activating plates, forward movement of those links which are associated with the rocked intermediary levers, clockwise rocking of the associated code-contact levers, and closure of these code contacts which correspond to the desired code combination, according to the auxiliary code family of the lower-case letter of the touched key top 4.

(D) *Restoration of the rocked and moved upper and lower-case code plate*

Figure 5:
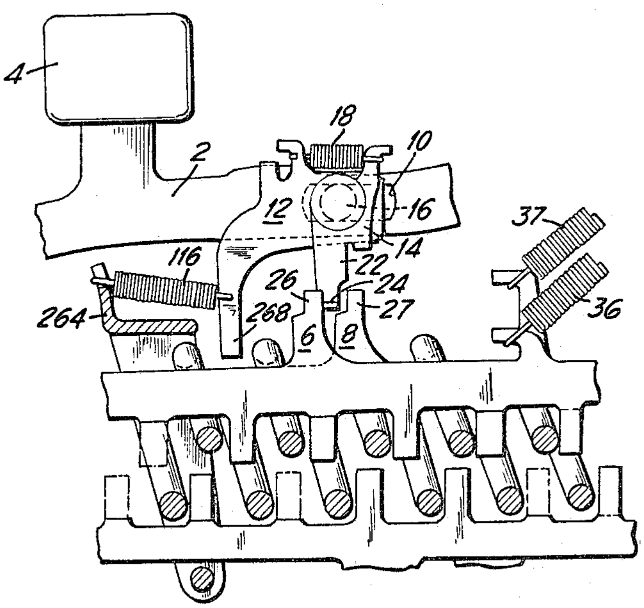
FIG. 5 is a similar view of the encoding portion shown with a letter key held inadvertently in the depressed position in the state shifted for the upper-case or the lower-case letters.

As already described, a touch given to a key top 4 causes the code-plate driving shaft 54 to rotate, see FIGS. 3, 4, and 17. The code-plate driving shaft 54 continues its rotation and, when the drive receiving shoulder 58 of the moved upper and lower-case code plate 6 moves to a position of non-interference with the driving ridge 56, this plate 6 is restored rearwards and counterclockwise by the associated upper and lower-case code-plate spring 36, see FIGS. 3 and 4. At the same time, the moved or displaced activating plates, such as 84–1 and 86–1, accompanied by the code bails, such as 74–1 and 76–1, are restored, see FIGS. 3 and 6, by activating-plate springs 110 associated with these plates. Also, the rocked intermediary levers, such as 90–1, and the rocked code-contact levers, such as 104, are restored by intermediary-lever and code-contact-lever springs 112 and 114, respectively. Even though the key top 4 may be held depressed, the upward projection 26 of the restoring upper and lower-case code plates 6 abuts, as seen in FIG. 5, against the front side surface of the downward extension 22 of the corresponding code-plate rocker 14 and moves the code-plate rocker 14 together with the switching plate 12 rearward along the key-lever slot 10 against the action of a switching-plate spring 116 which urges the switching plate 12 forward, with the result that the upper and lower-case code plate 6 is allowed to return to its rest position. Consequently, continued depression of a key top 4 does not result in repeated operation of the encoding portion and one touch or stroke on the key top 4 results in transmission of only one code combination.

(3) SHIFT FOR UPPER-CASE LETTERS (A) *Shift operation in the encoding portion*

FIG. 3 illustrates the various components in a state shifted for the lower-case letters. When an upper case shift key 118 is pressed down, an upper-case key lever 119 is rocked counterclockwise around the key-lever axle 28 until a downwardly projecting protrusion 120 thereof rocks, through a pin 122, an upper-case key bell crank 124 clockwise around a shift-key bell-crank axle 126 to pull a link 128 forward. The rear end of the link 128 is connected to a transmission lever 132 which is pivoted on a vertical stud 130 and provided with an upwardly projecting pin 138'. On the vertical stud 130, a shift-bell-crank rocking lever 134 is pivoted (the right-hand arm of the transmission lever 132 lies beneath this lever 134) and urged by a rocking-lever spring 136 to the upwardly projecting pin 138'. It follows therefore that as the upper-case shift key 118 is depressed, the transmission lever 132 is turned clockwise together with the shift-bell-crank rocking lever 134 to rock counterclockwise, around a shift-bell-crank axle 139, a shift bell crank 138 at its lower end, which lies adjacent to the shift-bell-crank rocking lever 134 in the state shifted for the lower-case letters or for the auxiliary-family operation.

Figures 12, 13:
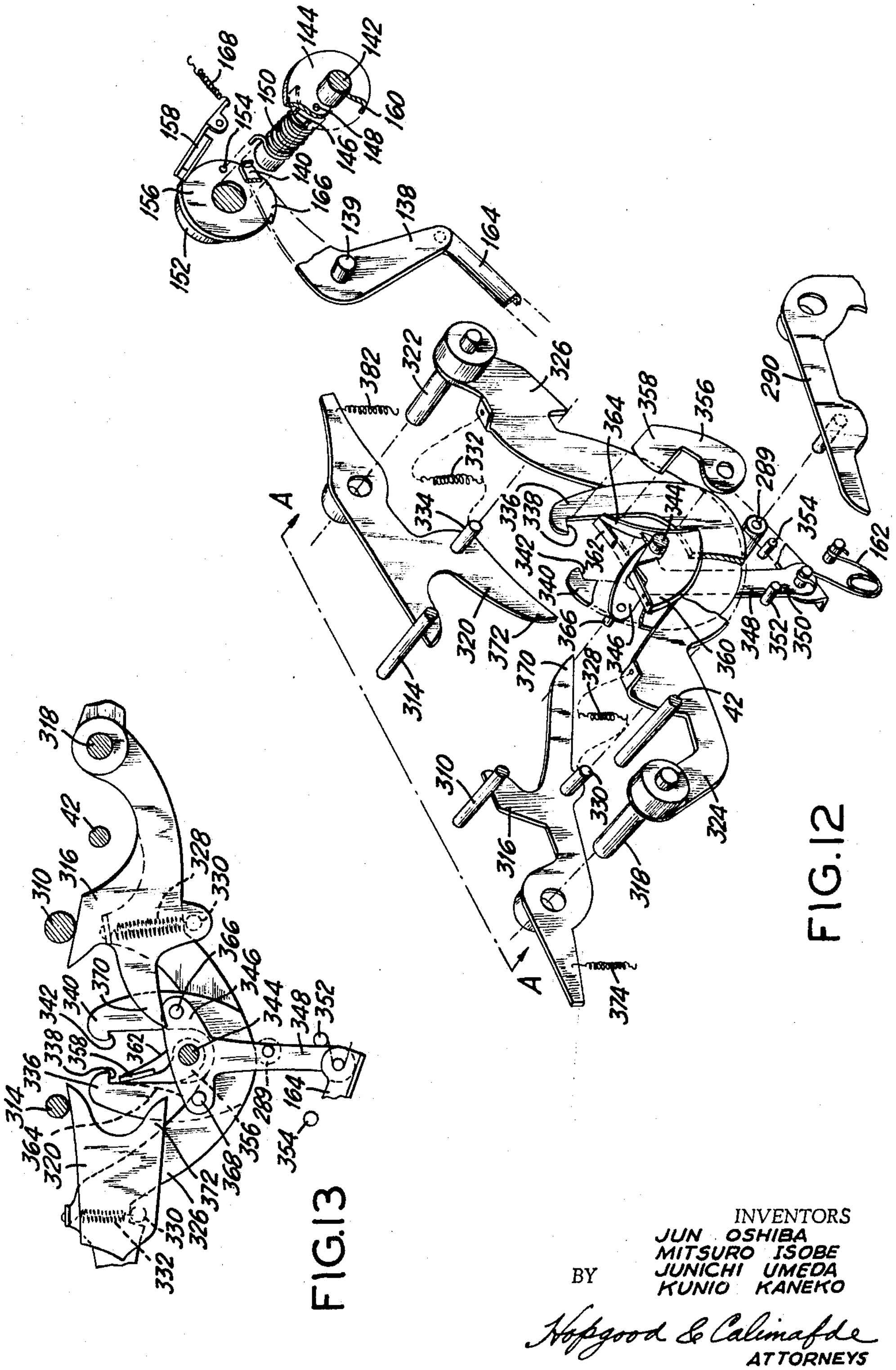
FIG. 12 is an exploded fragmentary perspective view of the automatic code-family shift and trigger-suppression releasing portion put in the same state as FIG. 11.
FIG. 13 is a partial sectional side view seen from the back of FIG. 11 as shown by the arrows A—A in FIG. 12.

Referring now to FIGS. 11 and 12, the shift bell crank 138 has a rear bent end 140 which engages, in the state shifted for the auxiliary-family operation, with an inner protrusion 146 of a spring holder 144 mounted in loose fit on a shift-shaft driving shaft 142 which is rotated constantly by a shift-shaft driving motor, not shown. When the shift bell crank 138 is rocked counterclockwise in the manner set forth, the rear bent end 140 is moved aside of the inner protrusion 146 to release the spring holder 144. The spring holder 144 has, as seen in FIG. 12, a small hole 148 therein, which fixedly carries an end of a clutch coupling spring 150 which is wound around the shift-shaft driving shaft 142 in a sinistral manner, i.e., in the sense of counterclockwise rotation thereof. The other end of the clutch coupling spring 150 is rigidly held in a small hole 154 provided in a shift-shaft 152. An auxiliary-family cam surface 156 of the shift-shaft 152 engages, in the state shifted for the auxiliary-family operation, with a shift locker 158. Also, the rear bent end 140 of the shift bell crank 138 then engages with the inner protrusion 146. As a result, the clutch coupling spring 150 cannot grasp the shift-shaft driving shaft 142 and the shift-shaft 152 therefore remains stationary. When the spring holder 144 is released as above, the clutch coupling spring 150 grasps the shift-shaft driving shaft 142 as the spring holder 144 is turned, to transmit the driving torque from the shift-shaft driving shaft 142 to the shift-shaft 152.

Figure 14:
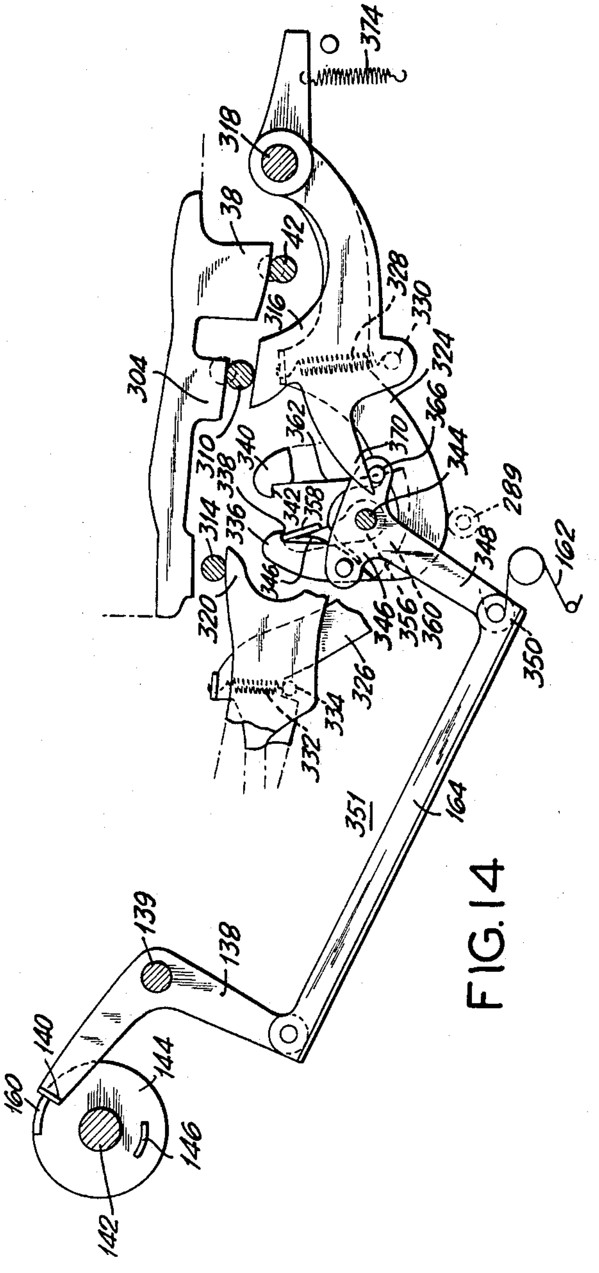
FIG. 14 shows, with a similar view seen from the back of FIG. 11, the automatic code-family shift and trigger-suppression releasing portion in a state where a middle-case code plate for a main-family letter is pressed down while the typewriter mechanism is put in the same state as in FIG. 11.
Figure 15:
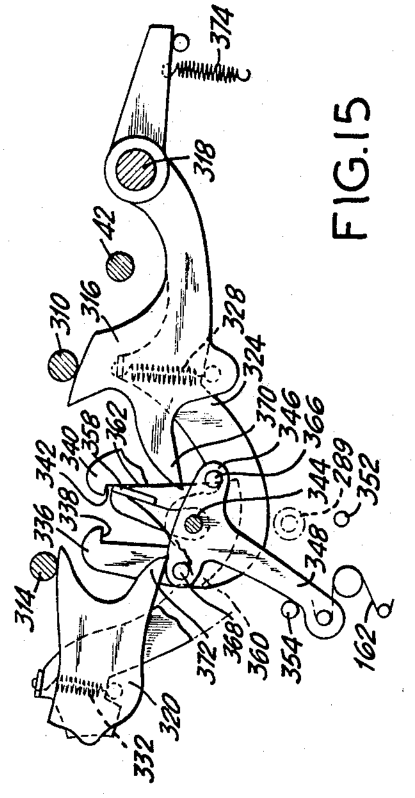
FIG. 15 shows, with a similar view, the automatic code-family shift and trigger-suppression releasing portion in a state shifted for the main-family operation.

Referring further to FIGS. 11 and 12, the spring holder 144 has an outer protrusion 160 spaced angularly from the inner protrusion 146 by 180°. When the spring holder 144 has been turned approximately 180°, the outer protrusion 160 abuts against the rear bent end 140 of the shift bell crank 138 which has been rocked counterclockwise as mentioned above to the position illustrated by chain lines in FIG. 11. FIG. 14 shows the shift bell crank 138 in this position in solid lines as seen from the back of FIG. 11. Meanwhile, the shift-shaft 152 tends to continue its rotation by virtue of its inertia so as to loosen the clutch coupling spring 150 but is retained, upon completion of its 180° rotation, by the shift locker 158 which now engages, by the action of a shift-locker spring 168 (FIG. 12), with a main-family cam surface 166 of the shift-shaft 152, spaced apart from the auxiliary-family cam surface 156 by approximately 180°. When the upper-case shift key 118 is released, see FIG. 3, the upper-case key lever 119, the upper-case-key bell crank 124, the link 128, the transmission lever 132, and the shift-bell-crank rocking lever 134 are all restored by an upper-case key spring 170, but the rear bent end 140 of the shift bell crank 138 remains in its outer position as indicated by the broken lines in FIG. 11, this crank being held in this position by the outer protrusion 160 of the spring holder 144.

Through the above-mentioned 180° rotation of the shift-shaft 152, each of a pair of shift cams, such as 172 (FIG. 3), rigidly carried by the shift-shaft 152 is also turned to push a shift-cam follower 174 upwardly, thereby to rock a shift follower lever 176 clockwise around a horizontal stud 178. A shifting pin 180 carried by each shift follower lever 176, slidably fits through a hole 184 formed in each of machine side frames, such as 182, into a horizontal slot 190 formed in each of the aforementioned side plates 188 of the intermediary-lever holder 186, so as to move the side plates 188 vertically along the machine side frames 182. This vertical movement of each side plate 188 is guided by guiding pin pairs 196–196′ and 198–198′ attached to each machine side frame 182 and designed to slidably fit into vertical slots 192 and 194 formed in each side plate 188 of the intermediary-lever holder 186. When the shift follower levers, such as 176, are rocked clockwise, the shifting pins, such as 180, raise the intermediary-lever holder 186 vertically upward against the action of a pair of intermediary-lever-holder springs, such as 200.

This upward movement of the side plates 188 of the intermediary-lever holder 186 raises all the intermediary levers, such as 90–1, see FIGS. 3, 6, 7 and 8. The amount of rise of the intermediary levers such as 90–1, is so adjusted that the bent tabs 94 thereof may be brought into face to face relation (FIG. 8) with the bent tabs 89 on the main-family activating plates, such as 84–1. The intermediary levers, such as 90–1, are urged (FIGS. 3 and 6) in their respective rest positions to the lower front surface of the intermediary-lever holder 186, by the intermediary-lever spring 112 which is attached to the respective rear extensions that extend through slots 202 formed in the intermediary-lever holder 186. Also, the coupling between each intermediary-lever, such as 90–1, and the coupled link 102 is achieved through a somewhat elongated pin hole 102, see FIG. 6. This is done so that the upward movement of the intermediary levers, such as 90–1, will not interfere with the positioning of the associated code-contact levers 104 when they are urged against the common code-contact-lever stopper 204 by their respective code-contact-lever springs 114, and also so that the slight rocking movement of each link 102 about its rear end (FIGS. 3 and 6) will not react on its associated intermediary-lever, such as 90–1, to affect the position thereof.

(B) *Sending out of a main-family shift code combination and subsequent code combinations*

The above described 180° rotation of the shift-shaft 152 (FIG. 3) causes, through a protruded portion 208 of an integral shift-code cam 206, a main-family code-contact lever 212 to close a main-family code-contact group 210, so as to send out the main-family shift code combination.

A subsequent stroke given to a key top 4 (FIGS. 3 and 4) causes, in the same manner as the above described state shifted for the lower-case letters, the bent end 24 of the code-plate rocker 14 to push down the associated upper and lower-case code plate 6 and to release the code-plate clutch mechanism. The resulting rotation of the code-plate driving shaft 54 (FIGS. 3 and 7), moves the pushed-down upper and lower-case code plate 6 forward to make the code protrusions, such as 64–1 and 66–2, move the activating plates, such as 84–1 and 86–2. Inasmuch as the intermediary-levers, such as 90–1, are now in the state (FIG. 8) shifted for the main-family operation and in a position to engage the moved main-family activating plates, such as 84–1, only the movement of the main-family activating plates is transmitted to the respective code contacts, such as 106, to send out the desired code combination allotted to the upper-case letter of the touched key top 4 according to the main code family.

(C) *Spurious shift operation*

When the upper-case shift key 118 is again touched while the machine is shifted for the main-family operation, the shift-bell-crank rocking lever 134 (FIG. 3) is rocked counterclockwise. Inasmuch as the lower end of the shift bell crank 138 has already been moved rearward (to the main-family shift position) during the preceding shift operation, this lever 134 is moved, without other operation produced thereby, to maintain the shift-shaft 152 still.

(4) SHIFT RELEASE FOR LOWER-CASE LETTERS (A) *Shift for lower-case letters*

When a lower-case shift key 214 (FIG. 3) is depressed, a lower-case key lever 216 is rocked counterclockwise to pull a link 218 forward; the specific mechanism therefor is not illustrated, because such mechanism is similar to the above-described mechanism for the upper-case shift key 118. The link 218 rocks a lever 222 carried by a release shaft 220 clockwise against the action of a spring 224, to rock clockwise a release lever 226 fixedly carried by the release shaft 220. A release pin 228 is attached to the lower end of the release lever 226 and lies, in the state shifted for the main-family operation adjacent and to the rear of the lower end of the shift bell crank 138. The clockwise rock of the release lever 226 therefore pushes the lower end of the shift bell crank 138 and rocks the same clockwise to the position indicated by the solid lines in FIG. 11. Consequently, the rear bent end 140 of the shift-bell-crank 138 is moved to a position aside of the outer protrusion 160 of the spring holder 144 to make the shift-shaft driving shaft 142 rotate this spring holder 144. It follows therefore that, like the shift for the main-family operation, the clutch coupling spring 150 operably couples the shift-shaft driving shaft 142 with the shift-shaft 152, to cause the former to rotate the latter by 180° until the inner protrusion 146 of the spring holder 144 engages with the rear bent end 140 of the shift-bell-crank 138, and the auxiliary-family cam surface 156 engages with the shift locker 158 (FIG. 12).

Thus, a touch given to the lower-case shift key 214 causes the shift-shaft 152 (FIG. 3) to rotate each shift cam 172 and thereby to rock the associated shift follower lever 176 counterclockwise, until the shift cam followers, such as 174, are pulled inwardly by shift-follower-lever springs, such as 230, and also by the intermediary-lever-holder springs, such as 200, to reach the respective innermost surface portions of the shaft cams, such as 172.

As a result, the side plates, such as 188, of the intermediary-lever holder 186 are pulled downwardly by the springs 200 in accordance with the downward excursion of the shifting pins, such as 180, of the shift follower levers 176, to put (FIGS. 3, 6, and 7) the intermediary-lever holder 186 into the state shifted for the auxiliary-family operation, where the intermediary levers, such as 90–1, are in a position (FIGS. 6 and 7) capable of engaging the respective auxiliary-family activating plates, such as 86–1.

Also, the shift-shaft 152 (FIG. 3) rotates the shift-code cam 206, which causes, through an auxiliary-family code-contact lever 232', an auxiliary-family code-contact group 214' to send out the auxiliary-family shift code combination.

When the lower-case shift key 214 is restored, the release lever 226 is also restored, but the rear bent end 140 of the shift-bell-crank 138 is kept in its inner position (FIG. 11, solid lines) by the inner protrusion 146 of the spring holder 144.

(B) *Spurious shift operation*

If the upper-case shift key 118 is depressed while the lower-case shift key 214 is kept depressed, the shift-bell-crank rocking lever 134 does not follow the counterclockwise rocking movement of the transmission lever 132 but causes mere extension of the rocking-lever spring 136, because the shift-bell-crank rocking lever 134 has already been rocked counterclockwise by the release pin 228 attached to the lower end of the release lever 226 which is kept in the clockwise rocked position by the depressed lower-case shift key 214.

If the lower-case shift key 214 is again depressed in the state shifted for the lower-case operation, the release lever 226 is again rocked clockwise. The lower end of the shift-bell-crank 138 has, however, been kept in the forward position (the auxiliary-family position), with the result that the release lever 226 is moved without other operation being produced thereby, the shift-shaft 152 being maintained in the non-rotatable condition.

(5) SHIFT FOR MIDDLE-CASE LETTERS

(A) *Switching of switching plates*

When a middle-case shift key 232 (FIG. 3) is depressed while the typewriter mechanism is shifted for the upper-case or the lower-case letters, a middle-case key lever 234 is rocked counterclockwise, whose downwardly projecting protrusion 236 rocks, through a pin 238, a middle-case-key bell crank 240 clockwise around the shift-key bell-crank axle 126 to pull a link 242 forward. This movement of the link 242 causes operation of a switching clutch mechanism (not shown) to rotate a switching cam 244 one complete revolution. This causes downward movement of a follower roller 248 attached to a switching bell crank 246, to rock the same clockwise around the axis of a shaft which rigidly carries this crank, until the upper arm of the crank is placed slightly below the upper bank of a notch formed in a latch lever 252. As a result, the upper bank of the notch of the latch lever 252 engages, by the action of a latch-lever spring 254, with the upper arm of the switching bell crank 246 so that this bell crank 246 is not restored by a switching-bell-crank spring 256 even after the switching cam 244 has completed its one revolution. The switching shaft 247 fixedly carries on its righthand end a lever 258 coupled in turn with a link 260, which is connected to a switching bail 264, biased counterclockwise by a switching-bail spring 262. As a result, when the switching bell crank 246 is rocked clockwise and then is locked by the latch lever 252, the switching bail 264 is held in a position rocked clockwise about a pair of pivots 266.

The switching plate 12 of each key lever 2 has (FIGS. 3 and 9) a downwardly projecting arm 268 linked with the switching bail 264 by the switching-plate spring 116. Therefore, rocking of the switching bail 264 pushes the switching plates, such as 12, in the rearward direction. The code-plate rockers, such as 14, are therefore also moved rearward until their respective bent ends, such as 24, are brought directly above upward projections 27 on the middle-case code plates, such as 8, respectively. Each switching plate 12 has a bent tab 300 which slides on an upper edge 302 of the associated key lever 2 to prevent the switching plate 12 from being rocked counterclockwise around the pin 16.

(B) *Trigger suppression for a middle-case code plate*

The switching-bell-crank 246 (FIG. 17) has at the lower end of its lower arm a link 276, the front end of which is coupled, at a slot 280, with a trigger suppressing bell crank 278 pivoted on a horizontal stud 277. From the upper and the lower edges of the front end of the trigger suppressing bell crank 278, there extends a trigger suppressing protrusion 282 and a trigger-release receiving protrusion 284, respectively, protruding in opposite directions. When the middle-case shift key 232 is depressed and the switching bell crank 246 has been locked in a clockwise rocked position, the trigger suppressing bell crank 278 is rocked clockwise by the link 276. This clockwise rock of the trigger suppressing bell crank 278 is assisted by a trigger-suppressor spring 286 which is weaker than the switching-bell-crank spring 256. Upon substantial clockwise rocking action of the trigger suppressing bell crank 278, the trigger suppressing protrusion 282 stands in the path of a trigger suppression side arm 288 of the trigger link 48, which otherwise releases the code-plate clutch mechanism for causing one revolution of the code-plate driving shaft 54.

(C) *Spurious shift operation*

Another touch given to the middle-case shift key 232 will cause, through another pull of the link 242, operation of the switching clutch mechanism to allow another complete revolution of the switching cam 244. The upper arm of the switching-bell-crank 246, however, has not been restored to the higher position from the lower position locked by the latch lever 252. As a result, such second depression of the middle-case shift key has no effect.

Figure 9:
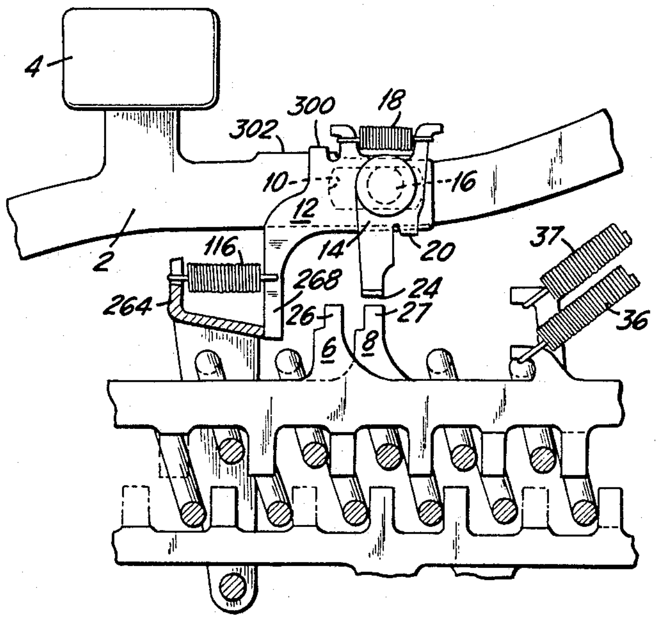
FIG. 9 is a partial sectional side view of the encoding portion, shown in a state shifted for the middle-case letters.
Figure 10:
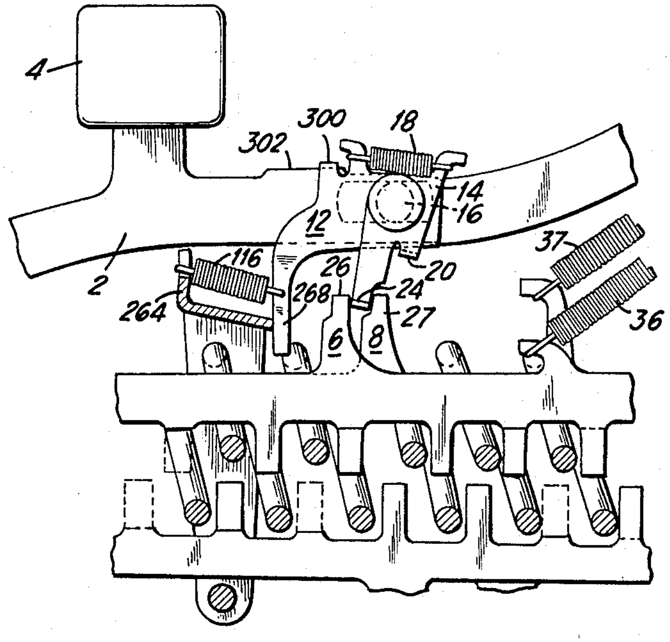
FIG. 10 is a similar view of the encoding portion, shown in a state where the typewriter mechanism is subjected to the shift for the middle-case letters while a letter key is held inadvertently in the depressed position.

When a key top 4 is held down in the state shifted for the upper-case or the lower-case letters, the accompanying code-plate rocker 14 and the switching plate 12 are brought (FIG. 5) to a position where the bent end 24 protrudes between the upward projections 26 and 27 of the associated upper and lower-case and middle-case code plates 6 and 8. If the middle-case shift key 232 is depressed under such circumstances, the code-plate rocker 14 in question is pushed rearward by the coupled switching plate 12 and is rocked clockwise (FIG. 10) on account of the engagement of the rear side surface of the bent end 24 and the front side surface of the upward projection 27 of the middle-case code plate 8 in question which has already been restored to the rest position and prevented from moving rearward by the code-plate axle 30. When the key top 4 is released, the code-plate rocker 14 is rocked counterclockwise by the code-plate rocker spring 18 to place the bent end 24 in the desired middle-case position (FIG. 9).

(6) MIDDLE-CASE OPERATION

(A) *From a key top to either a main-family or an auxiliary-family shift bail*

When a key top 4 is subjected to a touch in the state where the typewriter mechanism is shifted for the middle-case letters, the bent end 24 of the associated code-plate rocker 14 presses down the upward projection 27 of the coupled middle-case code plate 8 to rock this code plate. The middle-case code plate 8 is thus held in the rocked position as was the case with the rocked upper and lower-case code plate 6.

The middle-case code plate 8 has on its lower edge, besides the clutch-trigger projection 38, either a main-family shift protrusion 304 (FIGS. 4, 11, and 14) or an auxiliary-family shift protrusion 306 (FIGS. 16 and 17). More particularly, if the middle-case letters belong to the main code family, the middle-case code plate 8 does not have the rear auxiliary-family shift protrusion 306 but rather the front main-family shift protrusion 304. If the middle-case letter belongs to the auxiliary code family, the middle-case code plate does not have the main-family shift protrusion but rather the auxiliary-family shift protrusion 306. The main-family shift protrusions, such as 304, are accompanied in common by a main-family shift bail 310. The auxiliary-family shift protrusions, such as 306, are accompanied in common by an auxiliary-family shift bail 314. Such shift bails 310 and 314 are rockable at the respective pair of pivots 308 and 312.

(B) *Automatic code-family shift mechanism with trigger-suppression releasing mechanism*

The main-family and the auxiliary-family shift bails 310 and 314 (FIGS. 3 and 11–16) accompany a main-family shift activating lever 316 pivoted on a short axle 318 and an auxiliary-family shift activating lever 320 pivoted on a similar short axle 322, respectively. In juxtaposed relation to these shift activating levers 316 and 320, a trigger releasing main-family lever 324 and a trigger releasing auxiliary-family lever 326 are arranged, respectively, pivotably around the respective short axles 318 and 322. The trigger releasing main-family lever 324 is pulled by a main-family spring 328 toward a pin 330 carried by the main-family shift activating lever 316. The trigger releasing auxiliary-family lever 326 is likewise urged by an auxiliary-family spring 332 toward a similar pin 344 carried by the auxiliary-family shift activating lever 320. The trigger releasing main-family lever 324 has a rear extension 336, on the upper end of which an acute main-family notch 338 is formed. Similarly, the trigger releasing auxiliary-family lever 326 has a long-extending front extension 340 on the upper end of which an acute auxiliary-family notch 342 is formed.

Between the rear extension 336 of the trigger releasing main-family lever 324 and the front extension 340 of the trigger releasing auxiliary-family lever 326 (FIGS. 3 and 11–16), a shift-state indication and shift transmission pole 346 is pivoted, the same being rigidly carried by a horizontal center rod 344. The shift-state indication and shift transmission pole 346 has a downward extension 348, whose lever end 350 is coupled by a link 164 with the lower end of the shift bell crank 138, so that the pole 346 may be in the rearward pulled and the frontward pushed positions between a main-family pin 354 and an auxiliary-family pin 352 in accordance with the respective states shifted for the main-family and the auxiliary-family operation by the crank 138. The shift-state indication and shift transmission pole 346, the link 164, and the shift bell crank 138 form a four-bar linkage 351, which is held in either the main-family position or the auxiliary-family position by a toggle spring 162 cooperating with one or the other of the outer and the inner protrusions 160 and 146 of the spring holder 144.

The horizontal center rod 344 carries a trigger release suppressor 356, supported for rocking movement, (FIGS. 11–16). The trigger release suppressor 356 is lightly supported on the front and the rear side surface of a top bent portion 358 thereof, by front and rear leaf springs 362 and 364 carried by a sector member 360 which is rigidly carried by the horizontal center rod 344. These members are so adjusted that when the shift bell crank 138 has rocked the shift-state indication and shift transmission pole 346 into the auxiliary-family position (FIGS. 11 and 13), the upper end of the top bent portion 358 may be urged by the front leaf spring 362 to the front side surface of the rear extension 336 at a point slightly lower than the main-family notch 338, and that when the pole 346 has been put into the main-family position (FIG. 15), the upper end of the top bent portion 358 may be urged by the rear leaf spring 364 to the rear side surface of the front extension 340 slightly below the auxiliary-family notch 342.

The shift-state indication and shift transmission pole 346 has (FIGS. 15, 16) a main-family shift transferring pin 366 and an auxiliary-family shift transferring pin 368 on opposite sides of the horizontal center rod 344. In the state shifted for the auxiliary-family operation (FIGS. 11, 13, and 16), the four-bar linkage 351 makes the main-family shift receiving pin 366 assume its higher position near a main-family shift activating tip portion 370 of the main-family shift activating lever 316, while the auxiliary-family shift receiving pin 368 assumes its lower position spaced apart from an auxiliary-family shift activating tip portion 372 of the auxiliary-family shift activating lever 320. In the state shifted for the main-family operation (FIGS. 14 and 15), the main-family shift receiving pin 366 is spaced apart from the main-family shift activating tip portion 370 and the auxiliary-family shift receiving pin 368 is placed near the auxiliary-family shift activating tip portion 372.

In contact with the bottom edges of the trigger release main-family and auxiliary-family levers 324 and 326 (FIGS. 11–17), there is provided a trigger release receiving roller 289 carried by a trigger releasing bell crank 290 (FIGS. 11, 12, and 17), which is pivoted on a horizontal stud 277 (FIG. 17) in juxtaposed relation to the trigger suppressing bell crank 278 and which is biased clockwise by a roller-urging spring 298 attached thereto adjacent a slot 295 formed in the lower portion of the crank 290. The trigger releasing bell crank 290 has a trigger releasing tip portion 291 in the proximity of the trigger-release receiving protrusion 284 of the trigger suppressing bell crank 278. The trigger releasing bell crank 290 is coupled, by means of a link 296 pivoted in the slot 295, with a release cam-follower 294 urged by a release cam-follower spring 281 to follow a release cam 292. This release cam 292 is made integral with the shift shaft 152 and is provided with main-family and auxiliary-family release protrusions 293 and 293′ (FIG. 17) similar to the areas of the main-family and the auxiliary-family cam surfaces 166 and 156, respectively (FIG. 12).

(C) *Automatic insertion of a main-family shift code combination*

When a stroke is given to a key top 4, in the state where the typewriter mechanism is shifted for the middle-case letters and where the preceding shift was for the auxiliary-family operation (FIGS. 11 and 13), the middle-case letter is assigned with a code combination according to the main code family, and the main-family shift protrusion 304 (FIGS. 4, 11, and 14) of the associated middle-case code plate 8 presses down the main-family shift activating lever 316 against the action of a spring 374, through the main-family shift bail 310. This moves, through the main-family spring 328, the trigger releasing main-family lever 324 down to a position where the main-family notch 338 engages with the top bent portion 358 of the trigger release suppressor 356, with the result that the trigger releasing bell crank 290 is not rocked enough to rock in turn the trigger suppressing bell crank 278 out of its operative state suppressing release of the code-plate clutch mechanism.

The main-family shift activating lever 316, however, is further rocked (FIG. 14) by the main-family shift bail 310, until the main-family shift activating tip portion 370 presses down the main-family shift receiving pin 366 to rock the shift-state indication and shift transmission pole 346 into the main-family position and to rock the integral sector member 360. The front leaf spring 362 of the trigger release auxiliary-family lever 326 is urged forward, but the rear leaf spring 364 is urged rearward by the top bent portion 358 engaged with the main-family notch 338. Meanwhile, the shift-state indication and shaft transmission pole 346 reverses the toggle spring 162 and moves, through the link 164, the rear bent end 140 of the shift bell crank 138 out of the way of the inner protrusion 146 of the spring holder 144 to allow 180° rotation of the shift shaft 152. Therefore, the shift shaft 152 puts all the intermediary levers, such as 90–1, into the main-family position (FIG. 8) and makes the main-family code-contact group 210 send out a main-family shift code combination.

(D) *Release of trigger suppression*

Immediately thereafter, the main-family release protrusion 293 of the release cam 292 (FIG. 17) rocks the release cam-follower 294 counterclockwise against the action of the release cam-follower spring 281 to rock in turn, through the link 296, the trigger releasing bell crank 290 counterclockwise, so that the trigger releasing tip portion 291 thereof may press down the trigger-release receiving protrusion 284 to put the trigger suppressing bell crank 278 into the inoperative state. The trigger link 48 now operates the code-plate clutch mechanism to allow one revolution of the code-plate driving shaft 54.

From the time of depression of the key top 4 until the rotation of the code-plate driving shaft 54, the middle-case code plate 8 (FIGS. 3 and 4) is held in the lower position by the associated code-plate leaf spring 34. In the meantime, a rear-upward protrusion 376 of the middle-case code plate 8 enters among balls 380 of a conventional ball-lock mechanism 378 (FIG. 4), with the result that even if another touch is given to another key top, it is impossible for a similar rear-upward protrusion of the associated middle-case code plate to enter the ball-lock mechanism 378. It is to be noted that the upper and lower-case code plates, such as 6, have similar rear-upward protrusions, such as 377, and a similar ball-lock mechanism 379. During one rotation of the code-plate driving shaft 54, the driving ridge 56 pushes the rocked middle-case code-plate 8 forward against the action of an accompanying middle-case code-plate spring 37.

(E) *Sending out of code combinations*

In case the middle-case letter of the key top 4 belongs to the main code family, the associated middle-case code-plate 8 (FIGS. 3 and 4) is provided with a main-family code-protrusion group 64′ at the upper bank of an opening 62′. Thus, if the middle-case letter of the key top 4 is the symbol "=," the main-family code protrusion group 64′ consists of main-family code protrusions 64′–1, 64′–3, 64′–4, 64′–5, and 64′–6 complying in the reverse order with the code combination 0111101 as shown in FIGS. 3 and 4. All the main-family code-protrusion groups, such as 64′, accompany the main-family code-bail group 74. Forward movement of the code-plate 8 therefore causes the main-family code-protrusions, such as 64′–1, to move forward, through the corresponding ones of the main-family code-bails, such as 74–1, the corresponding main family activating plates, such as 84–1. Inasmuch as all the intermediary levers, such as 90–1, are in their main-family positions, the code contacts 106 now send out the main-family code combination assigned to the middle-case letter.

(F) *Restoration of the middle-case code-plate, automatic code-family shift mechanism, and trigger-suppression releasing mechanism*

When the middle-case code-plate 8 is restored to its rest position by the middle-case code-plate spring 37, the pressed down main-family shift activating lever 316 is restored upwardly by the spring 374, and the trigger releasing main-family lever 324 is also rocked upwardly to its normal position to cause the main-family notch 338 to release the trigger-release suppressor 356. The trigger-release suppressor 356 is therefore pushed (FIGS. 14 and 15) at its top bent portion 358 by the rear leaf spring 364 toward the rear side surface of the front extension of the trigger releasing auxiliary-family lever 326. The shift-state indication and shift transmission pole 346 is left in the main-family position (FIG. 15) to indicate that the typewriter mechanism is in the main-family state.

(G) *Continued auxiliary-family operation*

When a key top 4 having a middle-case letter belonging to the auxiliary code family is depressed in a state (FIGS. 11 and 13) shifted for the middle-case letters and for the auxiliary-family operation, the auxiliary-family shift protrusion 306 (FIG. 16) of the associated middle-case code-plate 8 pushes down, through the auxiliary-family shift bail 314, the auxiliary-family shift activating lever 320 against the action of a spring 382. Inasmuch as the auxiliary-family shift receiving pin 368 is not at that time in a position to undergo the downward movement of the auxiliary-family shift activating tip portion 372, the shift-state indication and shift transmission pole 346 stands still in the auxiliary-family position. Therefore, the intermediary levers, such as 90–1, also remain in their auxiliary-family positions so that no shift code combination is sent out.

Inasmuch as the auxiliary-family notch 342 is now not in a position to be put into engagement with the trigger-release suppressor 356, the auxiliary-family shift activating lever 320 (FIG. 16) rocks the trigger-releasing auxiliary-family lever 326 downward a sufficient distance to push down the trigger-release receiving roller 389 to rock in turn the trigger-releasing bell crank 290 (FIG. 17). The trigger-releasing tip portion 291 therefore rocks the trigger suppressing bell crank 278 into the inoperative position to release the code-plate clutch mechanism. Thus, the code-plate driving shaft 54 moves the rocked middle-case code-plate 8 forward.

A middle-case code-plate 8 for a middle-case letter belonging to the auxiliary code family is provided (FIG. 17) at the lower bank of the opening 62′ with an auxiliary-family code-protrusion group 66′. Thus, if the middle-case letter of the key top 4 is the letter "E," the auxiliary-family code-protrusion group 66′ consists of auxiliary-family code-protrusions 66′–1, 77′–2, 66′–3, and 66′–7 corresponding, in the reverse order, to the code combination 1000111. All these auxiliary-family code-protrusion groups, such as 66′, accompany in common the auxiliary-family code-bail group 76. Therefore, the forward movement of the middle-case code-plate 8 now sends out the desired code combination allotted to the middle-case letter according to the auxiliary code family.

When the rocked and moved middle-case code-plate 8 is restored to its rest position by the accompanying middle-case code-plate spring 37, the auxiliary-family shift activating lever 320 is rocked back by the spring 382, and the trigger-releasing auxiliary-family lever 326 is also restored to the normal position (FIGS. 16 and 13). The trigger-releasing bell crank 290 (FIG. 17) is also rocked, together with the trigger-release receiving roller 289, to the normal position by the roller-urging spring 298. While the trigger link 48 is restored by one revolution of the code-plate driving shaft 54 (this restoring mechanism is not a part of the present invention and is therefore not explained in detail), the trigger suppressing bell crank 278, which has temporarily been put into the inoperative state by the trigger-releasing bell crank 290, is again put into the operative middle-case position by the trigger-suppressor spring 286, because in the instant state shifted for the middle-case letters, the lower arm of the switching bell crank 246 (FIGS. 3 and 17) is latched in the front position by the latch lever 252 to allow sufficient rocking movement of the trigger-suppressing bell crank 278.

(H) *Shift from main-family operation to auxiliary-family operation*

When a key top 4 having a middle-case letter belonging to the auxiliary code family is depressed in a state wherein the typewriter mechanism is shifted for the middle-case letters and for the main-family operation (FIG. 15), the auxiliary-family shift protrusion 306 of the depressed middle-case code-plate 8 presses down, through the auxiliary-family shift bail 314, the auxiliary-family shift activating lever 320. This in turn presses down the trigger-releasing auxiliary-family lever 326, which, however, is not depressed enough, because of the engagement of the auxiliary notch 342 with the trigger-release suppressor 356, to make the trigger-releasing bell crank 290 (FIG. 17) release the trigger suppression.

The auxiliary-family shift activating lever 320, however, is further pressed down until the auxiliary-family shift activating tip portion 372 pushes down the auxiliary-famliy shift receiving pin 368, to rock the shift-state indication and shift transmission pole 346 to the auxiliary-family position, and to rock the integral sector member 360. The shift-state indication and shift transmission pole 346 reverses the toggle spring 162 and lowers the upper bent end 140 of the shift bell crank 138 out of the way of the outer protrusion 160 of the spring holder 144 to allow 180° rotation of the shift-state 152 (FIGS. 12 and 14). Therefore, all the intermediary levers, such as 90–1, are put into the auxiliary-family positions (FIGS. 6 and 7) and the auxiliary-family code-contact group 214′ (FIG. 3) sends out an auxiliary-family shift code combination.

Immediately thereafter, the auxiliary-family release protrusion 293′ of the release cam 292 (FIG. 17) rocks the release cam-follower 294 counter-clockwise, which in turn rocks the trigger-releasing bell crank 290 also counterclockwise. This causes the trigger-releasing tip portion 291 to push down, through the trigger-release receiving protrusion 284, the trigger suppressing protrusion 282 out of the way of the trigger suppress side arm 288 of the trigger link 48. Thus, the code-plate dividing shaft 54 undergoes one revolution to drive the pressed down middle-case code-plate 8 forward. Inasmuch as the intermediary levers, such as 90–1, are in the auxiliary-family positions, the movement of the middle-case code-plate 8 sends out the desired code combination.

Upward restoration movement of the operated middle-case code-plate 8 allows return movement of the auxiliary-family shift activating and the trigger-releasing auxiliary-family levers 320 and 326. This causes the trigger-release suppressor 356 to be urged by the front leaf spring 362 to the front side surface of the rear extension 336 of the trigger-releasing main-family lever 324.

(I) *Continued main-family operation*

When a key top 4 having a middle-case letter belonging to the main code family is depressed in a state shifted for the middle-case letters and for the main-family operation (FIG. 15), the accompanying middle-case code-plate 8 rocks, through the thereby depressed main-family shift-bail 310, the main-family shift activating lever 316. The main-family shift activating tip portion 370, however, does not press down the main-family shift receiving pin 366, and therefore the shift-state indication and shift transmission pole 346 remains still in the main-family position.

Inasmuch as the trigger-release suppressor 356 does not engage with the main-family notch 338, the trigger-releasing main-family lever 324 rocks the trigger-releasing bell crank 290 (FIG. 27). This results in rotation of the code-plate driving shaft 54 and eventual sending out of the desired code combination of the middle-case letter.

When the rocked and moved middle-case code-plate 8 is restored to its normal position by the accompanying middle-case code-plate spring 37, the automatic code-family shift mechanism and the trigger-suppression releasing mechanism are returned to their rest states, with the four-bar linkage 351 and the intermediary levers, such as 90–1, left in their main-family positions, and the temporarily counterclockwise rocked trigger suppressing bell crank 278 (FIG. 17) brought to its operative middle-case position.

(7) SHIFT FROM MIDDLE-CASE OPERATION TO UPPER-CASE OR LOWER-CASE OPERATION (A) *Shift to upper-case operation*

In case the upper-case shift key 118 is depressed in the state shifted for the middle-case letters (FIG. 3), the upper-case key lever 119 is rocked counterclockwise causing a latch releasing pin 388 of a downwardly projecting arm 386 thereof to rock the latch lever 252 counterclockwise. Therefore, the latch lever 252 releases the upper arm of the switching-bell-crank 246 from the notch thereof. As a consequence, the switching-bell-crank 246 and the switching bail 264 are returned counterclockwise to their rest positions together with the interlinking mechanism, by the switching-bell-crank spring 256 and by the switching-bail spring 262. This in turn restores all the switching plates, such as 12, from the middle-case position shown in FIG. 9 to the upper and lower-case position illustrated in FIG. 4, by the respective switching-plate springs, such as 116. The counterclockwise rock of the switching-bell-crank 246 also causes (FIG. 17) counterclockwise rock of the trigger suppressing bell crank 278 from the operative middle-case position to the upper and lower-case position where the trigger suppressing protrusion 282 no longer stands in the way of the trigger-suppress side arm 288 of the trigger link 48. It is to be noted here that the switching cam 244 (FIG. 3) completes one complete revolution each time a touch is given to the middle-case shift key 232 so that the return movement of the switching-bell-crank 246 is not interfered with by this cam 244.

If the preceding state was shifted for the main-family operation, depression of the upper-case shift key 118 causes (FIG. 3) counterclockwise rock of the transmission lever 132 and the shift-bell-crank rocking lever 134, without any change of the state of the shift-bell-crank 138. If the preceding state was shifted for the auxiliary-family operation, depression of the upper-case shift key 118 results in counterclockwise rock of the shift-bell-crank 138 and consequent shift to the main-family positions of the intermediary levers, such as 90–1, and of the shift-state indication and shift transmission pole 346.

(B) *Shift to lower-case operation*

When the lower-case shift key 214 (FIG. 3) is depressed in the state shifted for the middle-case letters, the release shaft 220 rocks the release lever 226 clockwise, causing another latch releasing pin 390 carried by the release lever 226 to rock the latch lever 252 counterclockwise. This causes the required shift of the switching plates, such as 12, and of the code-plate rockers, such as 14, to the upper and lower-case-letter operation. Meanwhile, if necessary, shift of the intermediary levers, such as 90–1, and of the shift-state indication and shift transmission pole 346 is made to the auxiliary-family position.

From the foregoing, it will be appreciated that those skilled in the art may modify the embodiment of this invention in various ways. For instance, the letter code contacts, such as 106, may be fewer in number than the number of digits in a code combination, and may also be only one that is closed and opened time-sequentially by the code-contact levers, such as 104. Moreover, such a single code contact may be used to send out both the code-family shift code combinations and a space code combination. Even for more complicated mechanisms, such as the encoder-trigger controller mentioned in the preamble of this specification, it is now possible to devise a number of modifications in view of the teachings according to this invention. Furthermore, it is also possible, if desired, to type on a sheet of paper with the typewriter of this invention while simultaneously sending out a series of letter code combinations.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. An input-output typewriter comprising:

a plurality of letter keys, each being assigned with a first-letter-position letter, a second-letter-position letter, and a third-letter-position letter and being accompanied by a first-letter-position encoding-member group complying with a letter code combination allotted to said first-letter-position letter according to a first manner of allotment and a second-letter-position encoding-member group complying with a letter code combination allotted to said second-letter-position letter according to a second manner of allotment;

each of said letter keys as is assigned with a third-letter-position letter to which a letter code combination is allotted according to said first manner of allotment, being accompanied by a first-code-family third-letter-position encoding member group complying with the last-mentioned letter code combination and by a first code-family-shift operating member;

each of said letter keys as is assigned with a third-letter-position letter to which a letter code combination is allotted according to said second manner of allotment, being accompanied by a second-code-family third-letter-position encoding-member group complying with the last-mentioned letter code combination and by a second code-family-shift operating member;

first-letter-position shift-key means for shifting, when touched, the typewriter mechanism into a first-letter position where all the first-letter-position encoding-member groups are brought into cooperative relation with the respective letter keys;

second-letter-position shift-key means for shifting, when touched, said typewriter mechanism into a second-letter position where all the second-letter position encoding-member groups are brought into cooperative relation with the respective letter keys;

third-letter-position shift-key means for shifting, when touched, said typewriter mechanism into a third-letter-position where all the third-letter-position encoding-member groups are brought into cooperative relation with the respective letter keys and where all the first and the second code-family-shift operating members are brought into cooperative relation with the respective ones of said letter keys;

a code-family-shift indicator-activator, responsive to said first-letter-position and said second-letter-position shift-key means and to said first and said second code-family-shift operating members and capable of being put into a first-code-family position, when the same is not in such a code-family position, by a touch given to said first-letter-position shift key means and by said first code-family-shift operating member activated, while said typewriter mechanism is in said third-letter position, by a touch given to such one of said letter keys as is accompanied thereby, and being put into a second-code-family position, if the same is not in such a code-family position, by a touch given to said second-letter-position shift-key means and by said second code-family-shift operating member activated, while said typewriter mechanism is in said third-letter position, by a touch given to such one of said letter keys as is accompanied thereby;

at least one code contact for producing signals in succession, each representing one of the letter code combinations, a first-code-family shift code combination for use in indicating that the following at least one signal is one representing the letter code combination allotted to a letter according to said first manner of allotment, and a second-code-family shift code combination for use in indicating that the following at least one signal is one representing the letter code combination allotted to a letter according to said second manner of allotment;

a letter code-contact activator, responsive to said code-family-shift indicator-activator, for coupling, while said code-family-shift indicator-activator is in said first-code-family position, all said first-letter-position and said first-code-family third-letter-position encoding-member groups with said code contact, and for coupling, while said code-family-shift indicator-activator is in said second-code-family position, all said second-letter-position and said second-code-family third-letter-position encoding-member groups with said code contact;

a code-family code-contact activator, responsive to change of said code-family position of said code-family-shift indicator-activator, for causing, when said code-family-shift indicator-activator is put into said first-code-family position, said code contact to produce the signal representing said first-code-family shift code combination, and for causing, when said code-family-shift indicator-activator is put into said second-code-family position, said code contact to produce the signal representing said second-code-family shift code combination;

an encoder trigger responsive to a touch given to one of said letter keys while said typewriter mechanism is in one of said first-letter and said second-letter positions, for making the corresponding one of the accompanying first-letter-position and second-letter-position encoding-member groups activate said code contact through said letter code-contact activator, thereby causing said code contact to produce the signal representing the desired letter code combination;

and an encoder-trigger controller, responsive to said third-letter-position shift-key means, for suppressing the operation of said encoder trigger in case said typewriter mechanism is in said third-letter position;

said first and said second code-family-shift operating members cooperating, in case said typewriter mechanism is in said third-letter-position, with said code-family-shift indicator-activator and also with said encoder-trigger controller, to cause said encoder-trigger controller to temporarily put said encoder-trigger into operation when a touch is given to such one of said letter keys as is accompanied by the third-letter-position encoding-member group of the same code family as the code-family position of said code-family-shift indicator-activator, and to change the code-family position of said code-family-shift indicator-activator and thereafter cause said encoder-trigger controller to temporarily put said encoder-trigger into operation when a touch is given to such one of said letter keys as is accompanied by the third-letter-position encoding-member group of the code family different from the code-family position of said code-family-shift indicator-activator.

2. An input-output typewriter according to claim 1, wherein said encoder-trigger controller comprises:

an encoder-trigger suppressing member responsive to said third-letter-position shift-key means, for suppressing the operation of said encoder-trigger when said typewriter mechanism is in said third-letter-position;

a first encoder-trigger releasing member responsive to said code-family-shift operating members and said code-family-shift indicator-activator, for releasing for a predetermined short time interval the suppression originating with said encoder-trigger suppressing member when a touch is given, while said typewriter mechanism is in said third- letter-position, to such one of said letter keys as is accompanied by the third-letter-position encoding-member group of the same code family as the code-family position of said code-family-shift indicator-activator;

an encoder-trigger release suppressor responsive to said code-family-shift indicator-activator, to said code-family-shift operating members, and to said encoder-trigger releasing member, for suppressing, substantially for said time interval, the releasing operation of said encoder-trigger releasing member when a touch is given, while said typewriter mechanism is in said third-letter-position, to such one of said letter keys as is accompanied by the third-letter-position encoding-member group of the code family different from the code-family position of said code-family-shift indicator-activator;

said code-family-shift indicator-activator being put into the desired code-family position by one of said code-family-shift operating members during the suppressing operation effected by said encoder-trigger release suppressor;

and a second encoder-trigger releasing member responsive to change of said code-family position of said code-family-shift indicator-activator, for releasing said suppression originating with said encoder-trigger suppressing member after lapse of the time interval of said suppressing operation effected by said encoder-trigger release suppressor.

3. An input-output typewriter according to claim 1, wherein said letter keys are substantially equal in number to those in a conventional four-row touch-system typewriter, the letters including letters of at least two sorts of alphabets, numerals, punctuation marks, and symbols;

wherein a first group of letters consisting of said first-letter-position letters and of some of said third-letter-position letters are allotted to said letter keys, respectively, in compliance with a conventional arrangement for at least one of said two sorts of alphabets;

wherein a second group of letters consisting of said second-letter-position letters and of the others of said third-letter-position letters are allotted to said letter keys, respectively, in compliance with another conventional arrangement for the remaining at least one of said two sorts of alphabets;

wherein said first manner of allotment is one of conventional code families for allotting letter code combinations to letters of said first group, respectively;

and wherein said second manner of allotment is one of conventional code families for allotting letter code combinations to letters of said second group, respectively.

4. An input-output typewriter arrangement comprising:

a plurality of letter keys, each of said keys being assigned a first-letter-position letter, a second-letter-position letter, and a third-letter-position letter and being associated with a first-letter-position encoding-member group in accordance with a letter code combination allotted to said first-letter-position letter according to a first manner of allotment, and a second-letter-position encoding-member group in accordance with a letter code combination allotted to said second-letter-position letter according to a second manner of allotment;

each of said letter keys that is assigned with a third-letter-position letter to which a letter code combination is allotted according to said first manner of allotment, being accompanied by a first-code-family third-letter-position encoding-member group in accordance with the last-mentioned letter code combination and by a first code-family-shift operating member;

each of said letter keys that is assigned with a third-letter-position letter to which a letter code combination is allotted according to said second manner of allotment, being accompanied by a second-code-family third-letter-position encoding-member group in accordance with the last-mentioned letter code combination and by a second code-family-shift operating member;

first-letter-position shift-key means for shifting the typewriter mechanism into a first-letter-position where the first-letter-position encoding-member groups are brought into cooperative relation with their respective letter keys;

second-letter-position shift-key means for shifting the typewriter mechanism into a second-letter position where the second-letter-position encoding-member groups are brought into cooperative relation with their respective letter keys;

third-letter-position shift-key means for shifting the typewriter mechanism into a third-letter position where the third-letter-position encoding-member groups are brought into cooperative relation with their respective letter keys;

code-family-shift indicator-activator means responsive to said first-letter-position and said second-letter position shift-key means and to said first and said second code-family-shift operating members, and capable of being selectively put into a first-code-family position by said first-letter-position shift-key means and into a second-code-family position by said second-letter-position shift-key means;

at least one code contact for producing successive signals each representative of a different letter code combination;

a first-code-family shift code combination for use in indicating that the following at least one signal is one representing the letter code combination allotted to a letter according to said first manner of allotment, and a second-code-family shift code combination for use in indicating that the following at least one signal is one representing the letter code combination allotted to a letter according to said second manner of allotment;

a letter code-contact activator, responsive to said code-family-shift indicator-activator means for coupling said first-letter-position and said first-code-family third-letter-position encoding-member groups with said code contact while said latter mentioned means is in said first-code-family position, and for coupling said second-letter-position and said second-code-family third-letter-position encoding-member groups with said code contact while said latter mentioned means is in said second-code-family position;

a code-family code-contact activator for selectively producing a signal representing said first-code-family shift code combination and a signal representing said said second-code-family shift code combination, depending upon the code-family position of said code-family-shift indicator-activator means;

an encoder trigger responsive to one of said letter keys while the typewriter mechanism is in one of said first-letter and said second-letter positions, for making the corresponding one of the accompanying first-letter-position and second-letter-position encoding-member groups activate said code contact through said letter code-contact activator, thereby causing said code contact to produce the signal representing the desired letter code combination;

and an encoder-trigger controller responsive to said third-letter-position shift-key means for suppressing the operation of said encoder trigger when the typewriter mechanism is in said third-letter-position.

5. The invention described in claim 4, wherein said encoder-trigger controller comprises:

an encoder-trigger suppressing member responsive to said third-letter-position shift-key means for suppressing the operation of said encoder-trigger when the typewriter mechanism is in said third-letter position;

a first encoder-trigger releasing member responsive to said code-family-shift operating members and to said code-family-shift indicator-activator means for releasing for a predetermined short time interval the suppression originating with said encoder-trigger suppressing member upon actuation of a selected one of said letter keys while said typewriter mechanism is in said third -letter-position;

an encoder-trigger release suppressor responsive to said code-family-shift indicator-activator means, to said code-family-shift operating members, and to said encoder-trigger releasing member, for suppressing the releasing operation of said encoder-trigger releasing member substantially for said time interval upon actuation of a selected one of said letter keys while said typewriter mechanism is in said third-letter-position;

said code-family-shift indicator-activator means being put into the desired code-family position by one of said code-family-shift operating members during the suppressing operation effected by said encoder-trigger release suppressor;

and a second encoder-trigger releasing member responsive to change of said code-family position of said code-family-shift indicator-activator means, for releasing said suppression originating with said encoder-trigger suppressing member after lapse of the time interval of the suppressing operation effected by said encoder-trigger release suppressor.

6. The invention described in claim 4, wherein:

said letter keys are substantially equal in number to those in a conventional four-row touch-system typewriter, the letters including letters of at least two types of alphabets;

a first group of letters consisting of said first-letter-position letters and of some of said third-letter-position letters being allotted to said letter keys, respectively, in compliance with a conventional arrangement for at least one of said alphabets;

a second group of letters consisting of said second-letter-position letters and of the others of said third-letter-position letters being allotted to said letter keys, respectively, in compliance with another conventional arrangement for the remaining at least one of said two types of alphabets;

said first manner of allotment being one of conventional code families for allotting letter code combinations to letters of said first group, respectively;

and said second manner of allotment being one of conventional code families for allotting letter code combinations to letters of said second group, respectively.

7. The invention described in claim 4, wherein said code-family-shift indicator-activator means comprises a four bar linkage assembly.

8. The invention described in claim 4, wherein said encoder-trigger controller comprises an assembly including a trigger suppressing bell crank, a trigger releasing bell crank, at least one trigger releasing lever and a release cam.

References Cited by the Examiner

UNITED STATES PATENTS

| | | | |
|---|---|---|---|
| 848,653 | 4/1907 | Hutches | 197—19 |
| 1,651,740 | 12/1927 | Stickney | 197—72 |
| 2,398,457 | 4/1946 | Wallach | 197—72 XR |
| 2,471,588 | 5/1949 | Sears | 197—72 XR |
| 2,935,562 | 5/1960 | Punyaratband et al. | 197—1 XR |

ROBERT E. PULFREY, *Primary Examiner.*

EDGAR S. BURR, *Assistant Examiner.*